(12) United States Patent
Fukatani et al.

(10) Patent No.: US 8,127,101 B2
(45) Date of Patent: Feb. 28, 2012

(54) FILE SERVER WHICH CONDUCTS A MEMORY TEST UPON BOOT UP

(75) Inventors: Takayuki Fukatani, Yokohama (JP); Akiyoshi Hashimoto, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 754 days.

(21) Appl. No.: 12/243,015

(22) Filed: Oct. 1, 2008

(65) Prior Publication Data

US 2010/0042629 A1    Feb. 18, 2010

(30) Foreign Application Priority Data

Aug. 14, 2008    (JP) .................................. 2008-208901

(51) Int. Cl.
*G06F 11/22* (2006.01)
*G06F 12/02* (2006.01)

(52) U.S. Cl. .................. 711/171; 711/E12.006; 714/36; 714/718; 714/E11.149

(58) Field of Classification Search .................. None
See application file for complete search history.

(56) References Cited

U.S. PATENT DOCUMENTS

| | | | | |
|---|---|---|---|---|
| 5,155,844 | A * | 10/1992 | Cheng et al. | 714/36 |
| 5,375,227 | A * | 12/1994 | Akatsu et al. | 714/5.11 |
| 5,479,413 | A * | 12/1995 | Sicola et al. | 714/718 |
| 5,588,046 | A * | 12/1996 | Knuth et al. | 379/67.1 |
| 5,732,240 | A * | 3/1998 | Caccavale | 711/118 |
| 6,742,148 | B1 * | 5/2004 | Korhonen | 714/718 |
| 2004/0158701 | A1 * | 8/2004 | Merkin | 713/2 |
| 2005/0210074 | A1 * | 9/2005 | Nakatani et al. | 707/200 |
| 2006/0195846 | A1 * | 8/2006 | Benedetti | 718/102 |
| 2007/0214347 | A1 * | 9/2007 | Rothman et al. | 713/1 |

OTHER PUBLICATIONS

Jon William Toigo. The Holy Grail of Data Storage Management. 2000. Prentice-Hall. pp. 4-6.*
IBM. Tivoli Storage Manager for HP-UX: Installation Guide. Jan. 2007. IBM. 2nd ed. SC32-0135-00. pp. 21-22.*
Yervant Zorian. "Embedded Memory Test & Repair: Infrastructure IP for Soc Yield." 2002. IEEE. ITC 2002.*
Microsoft. "How to delay loading of specific service." Feb. 2007. Microsoft. Rev. 2.2.*
IBM. Tivoli Storage Manager for Windows: Administrator's Guide. Mar. 2002. IBM. 1st ed. GC32-0782-00. pp. 212-214.*

* cited by examiner

*Primary Examiner* — Reginald Bragdon
*Assistant Examiner* — Nathan N Sadler
(74) *Attorney, Agent, or Firm* — Brundidge & Stanger, P.C.

(57) ABSTRACT

Provided is a file server providing a file service to a host computer, including an interface coupled to the host computer; a processor; a memory; and an interface coupled to a disk drive. The file server is configured to calculate a capacity of storage areas in the memory, which is required to provide the file service; execute a first memory check in which the storage areas having the calculated capacity are tested; execute, after the first memory check is completed, a second memory check in which remaining storage areas in the memory are tested; and start, in a period after the first memory check is completed and before the second memory check is completed, providing the file service.

13 Claims, 16 Drawing Sheets

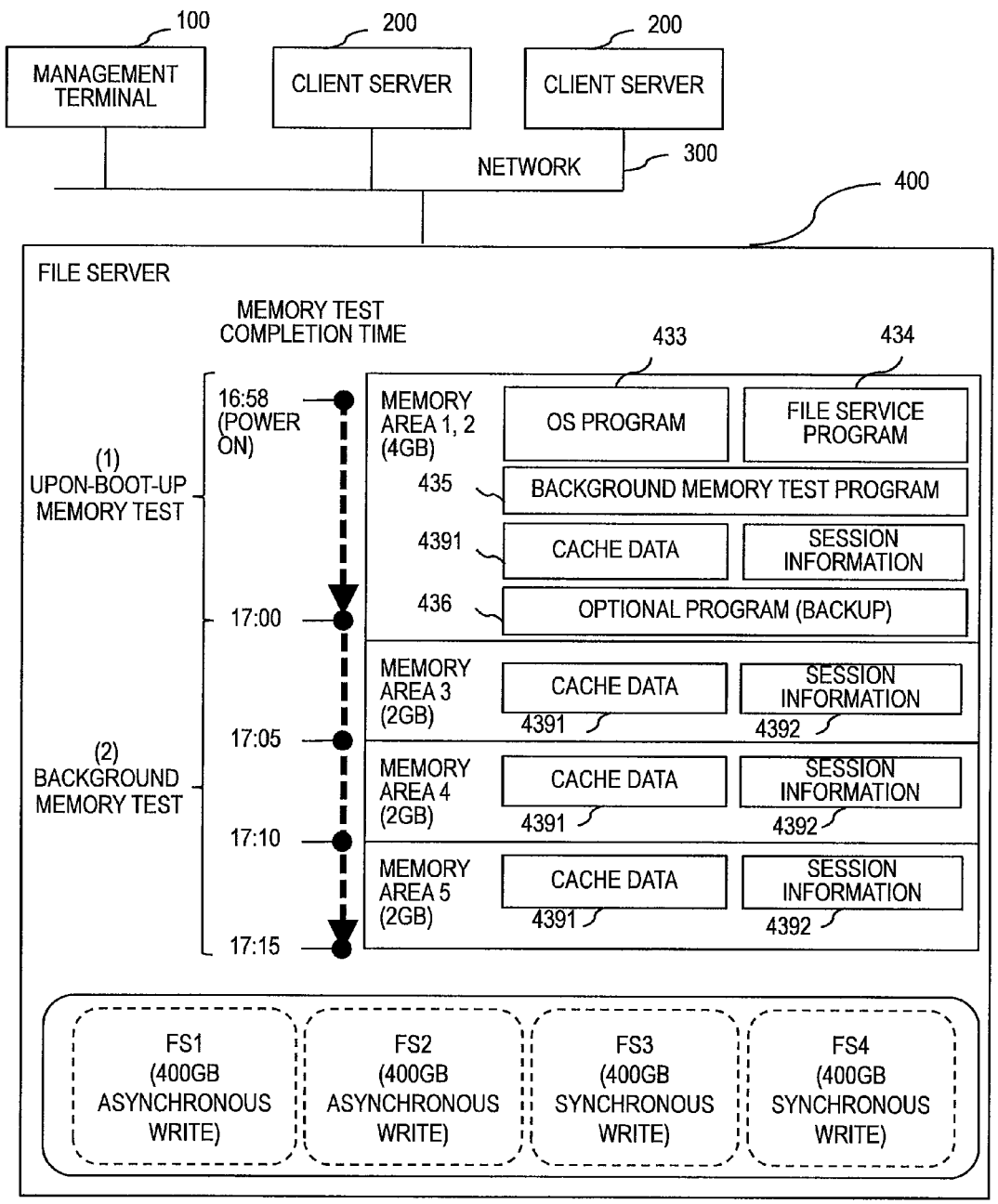
FIG. 3A    FS : FILE SYSTEM

| TIME | EVENT | BOOT LOADER STATE | OS STATE | OPTIONAL PROGRAM STATE | CACHE DATA AMOUNT | MAXIMUM CONCURRENT CONNECTION COUNT |
|---|---|---|---|---|---|---|
| 16:58 | POWER ON | MEMORY TEST STARTED | - | - | - | - |
| 17:00 | MEMORY AREAS 1, 2, TEST COMPLETED | OS BOOT | BOOT STARTED | STARTED UP | 2GB | 1600 |
| 17:05 | MEMORY AREA 3, TEST COMPLETED | - | RUNNING | RUNNING | 3.5GB | 3200 |
| 17:10 | MEMORY AREA 4, TEST COMPLETED | - | RUNNING | RUNNING | 5GB | 4800 |
| 17:15 | MEMORY AREA 5, TEST COMPLETED | - | RUNNING | RUNNING | 6.5GB | 6400 |

*FIG. 3B*

| OPTIONAL PROGRAM NAME | MEMORY CAPACITY USAGE | PRIORITY LEVEL |
|---|---|---|
| SNAPSHOT | 100MB | 3 |
| BACKUP | 500MB | 1 |
| FILE MIGRATION | 150MB | 3 |

*FIG. 6*

| FILE SYSTEM NAME | AFFILIATED FILE SERVER | OPERATING FILE SERVER |
|---|---|---|
| FS1 | FILE SERVER 1 | FILE SERVER 1 |
| FS2 | FILE SERVER 1 | FILE SERVER 1 |
| FS3 | FILE SERVER 1 | FILE SERVER 1 |
| FS4 | FILE SERVER 1 | FILE SERVER 1 |

*FIG. 7*

F.O.: FAIL OVER
F.B.: FAIL BACK

SERVICE LEVEL SETTING WINDOW

UPON-BOOT-UP SERVICE LEVEL SETTING WINDOW

CACHE DATA CAPACITY: 2GB — 110A

SESSION COUNT: 4000 — 110B

META DATA CACHE CAPACITY: 1GB — 110E

OPTIONAL PROGRAM: — 110C

- ☐ SNAPSHOT
- ■ BACKUP
- ☐ FILE MIGRATION
- ☐ REMOTE BACKUP
- ☐ META DATA RESIDENT PROCESSING

RUNNING-UPON-BOOT-UP FILE SYSTEM: — 110D

- ■ FILE SYSTEM 1
- ■ FILE SYSTEM 2
- ☐ FILE SYSTEM 3
- ☐ FILE SYSTEM 4

*FIG. 13*

FILE SERVER WHICH CONDUCTS A MEMORY TEST UPON BOOT UP

CLAIM OF PRIORITY

The present application claims priority from Japanese patent application JP 2008-208901 filed on Aug. 14, 2008, the content of which is hereby incorporated by reference into this application.

BACKGROUND

This invention relates to a method for improving reliability of a file server, and more particularly, to a method for accelerating a memory test of a large-capacity memory upon system boot up.

The recent increase in amount of data stored in companies, research facilities, and other organizations has created a demand for a high-performance file server which stores data in a network, and is causing a memory installed in a file server to have larger capacity. In order to improve the reliability of a file server, a high-precision memory test is desirably conducted each time the system boots up, and hence a memory error is detected in advance. Conducting a high-precision memory test, however, involves reading and writing a plurality of test patterns from and to the memory medium, and a problem is that the time required for the memory test increases linearly as the memory capacity increases.

As a solution to this problem, a method has been disclosed in which a memory test is conducted upon system boot up only on an area used to start up the OS, and a memory test for the rest area is performed in the background after the start up (see U.S. Pat. No. 5,155,844, for example).

According to the prior art where the file server tests only a memory area that is necessary to start up the OS upon system boot up, the OS can be started up within a fixed period of time, irrespective of the capacity of the installed memory.

However, in order for the file server to be able to provide a file service immediately after system boot up, a memory capacity necessary for the file service has to be secured in addition to the memory capacity necessary for the OS startup. When the file server starts providing a file service without securing the necessary memory capacity first, evacuation of stored data from the memory to a disk can cause a significant drop in system performance or memory exhaustion can bring the system down.

There has been no existing technique that can adequately estimate the memory capacity necessary to provide a file service. Estimating the necessary memory capacity adequately is particularly difficult with file servers because the count and capacity of managed file systems differ from one file server running environment to another, and the memory capacity usage varies depending on whether there is an optional program for improving the reliability and the usability in data backup and other operations.

SUMMARY

This invention has been made in view of the above-mentioned respects, and it is therefore an object of this invention to minimize the time required for a memory test, and accordingly shorten the time required for system boot up by calculating in advance the necessary memory capacity that is suited to the running environment of a file server, and conducting the memory test upon system boot up only on the memory capacity necessary to provide a file service.

The representative aspects of this invention are as follows. That is, there is provided a file server providing a file service to a host computer, including one or more interfaces coupled to the host computer; a processor; a memory; and one or more interfaces coupled to a disk drive. The file server is configured to calculate a capacity of storage areas in the memory, which is required to provide the file service; execute a first memory check in which the storage areas having the calculated capacity are tested; execute, after the first memory check is completed, a second memory check in which remaining storage areas in the memory are tested; and start, in a period after the first memory check is completed and before the second memory check is completed, providing the file service.

According to an embodiment of this invention, the time required for a memory test upon system boot up can be minimized and the time required for system boot up can be accordingly shortened while securing the necessary memory capacity that is suited to a particular file service running environment that a file server employs.

BRIEF DESCRIPTION OF THE DRAWINGS

The present invention can be appreciated by the description which follows in conjunction with the following figures, wherein:

FIG. 3A is an explanatory diagram outlining a memory test in a file server in accordance with the first embodiment of this invention;

FIG. 3B is an explanatory diagram showing an event and a state at each time point in a memory test in accordance with the first embodiment of this invention;

FIG. 6 is an explanatory diagram showing an optional program configuration information table in accordance with the first embodiment of this invention;

FIG. 7 is an explanatory diagram showing a cluster configuration information table in accordance with the first embodiment of this invention;

FIG. 13 is an explanatory diagram showing a service level setting window in accordance with a third embodiment of this invention.

DETAILED DESCRIPTION OF THE PREFERRED EMBODIMENTS

This invention is outlined as follows.

In this invention, a file server calculates a memory capacity that will be needed to provide a file service at a changed service level which is changed by a configuration change of a file system, a configuration change of an optional program, or a user's request, and then determines a memory area on which a memory test is to be conducted upon system boot up.

A memory area is a logically or physically partitioned memory medium. The service level of a file server refers to a file service quality measured by the data access performance, the number of clients that can access the file server simultaneously, whether or not various optional programs are started up, or the like. A file server in this invention also conducts a memory test in the background after starting providing a file service. The file server performs the memory test on one memory area at a time, initializes the memory area upon completion of the memory test, and designates each initialized memory area as a cache data storage area, a session (with client) information storage area, or an optional program-allocated area.

This invention enables a file server to secure a memory capacity that suits the employed file server running environment immediately after system boot up and to minimize the system boot up time. Further, since a memory test is conducted in the background and a memory area on which the memory test has finished is used for a file service, the file server can increase the memory capacity available to the file service without waiting for the completion of a memory test on all memory areas. "Session information" here refers to information about the state of a client seccion that accesses a file server using Common Interface File System (CIFS) or other similar file access formats.

A detailed description will be given below on embodiments of this invention with reference to the accompanying drawings.

First Embodiment

A first embodiment of this invention will be described with reference to FIGS. 1 to 10B.

(1-1) Configuration of a Computer System according to the First Embodiment

Figure 1:
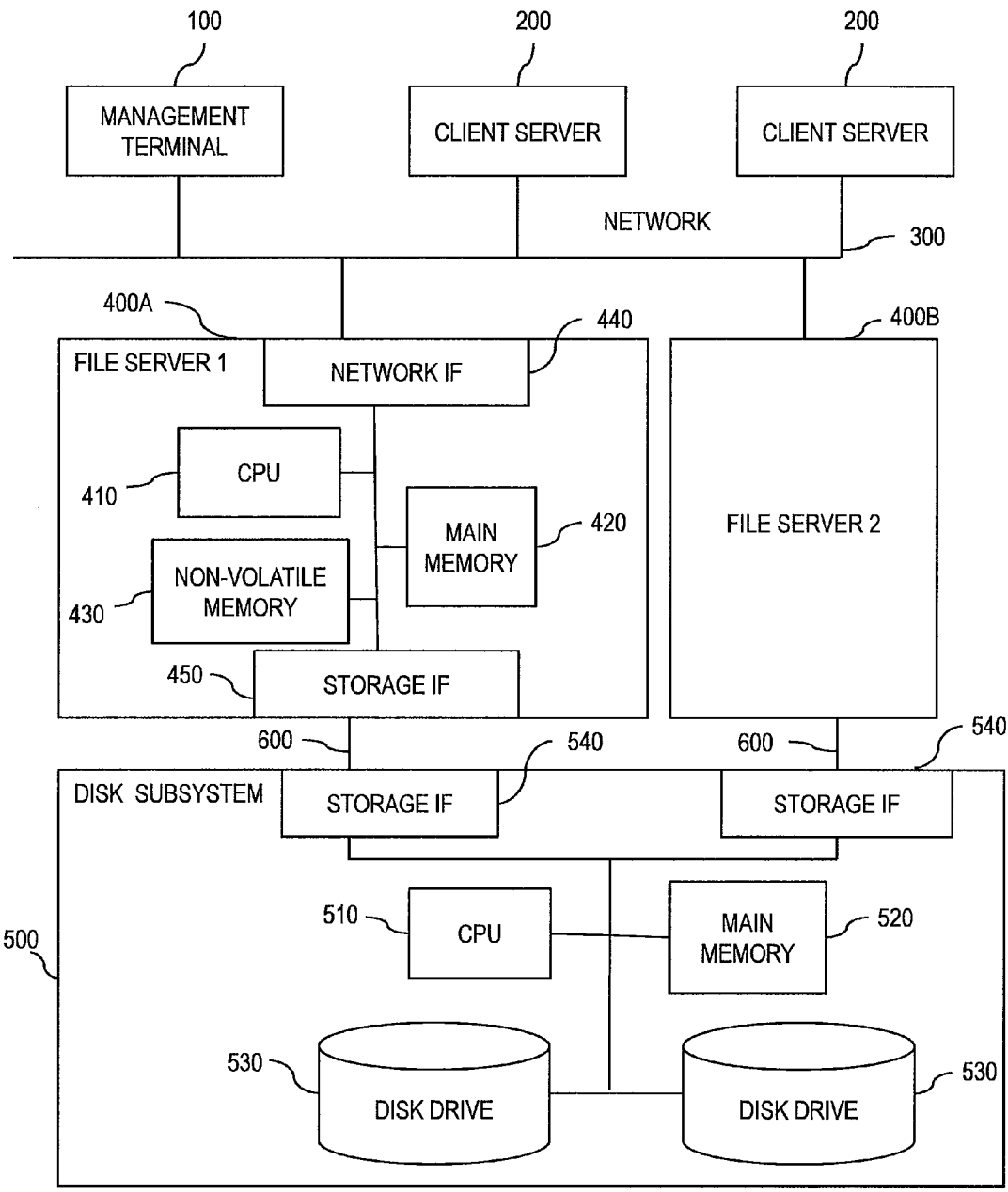
FIG. 1 is a block diagram showing a hardware configuration of a computer system in accordance with a first embodiment of this invention.

FIG. 1 is a block diagram showing a hardware configuration of a computer system according to the first embodiment of this invention.

The computer system includes at least one file server 400, at least one client server 200, at least one management terminal 100, and at least one disk subsystem 500. Each file server 400 is a computer including a central processing unit (CPU) 410, a main memory 420, a non-volatile memory 430, and other components. The file server 400 also includes a network interface (IF) 440 for coupling with a network 300 and a storage interface (IF) 450 for coupling with the disk subsystems 500.

In FIG. 1, a plurality of file servers 400 are shown. One of the file servers 400 is a first file server 1 (400A) and another one of the file servers 400 is a second file server 2 (400B). Hereinafter, when a description applies to the first file server 1 (400A) and the second file server 2 (400B) both, "file server 400" will be used as a collective term for the first file server 1 (400A) and the second file server 2 (400B).

In the case where the computer system includes at least two file servers 400, the first file server 1 (400A) and the second file server 2 (400B) may form a cluster. However, the first embodiment is also applicable to the case where a plurality of file servers 400 do not form a cluster. The cluster configuration will be described later with reference to FIGS. 7 and 11.

The CPU 410 executes various programs stored in the main memory 420. The main memory 420 stores various programs and various types of data which will be described later. The non-volatile memory 430 stores various types of settings information of the file server 400. The non-volatile memory 430 here is a semiconductor memory that can keep stored data even after power supply is stopped, for example, a complementary metal oxide semiconductor (CMOS) memory or a flash memory.

The network IF 440 is constituted of a network interface card capable of communication at various speeds (e.g., 10 Gbps or 1 Gbps), such as Ethernet interface card or a wireless local area network (LAN) interface card. The network IF 440 functions as a data input/output adapter for coupling the file server 400 to the client servers 200 and the management terminals 100.

The storage IF 450 is constituted of an interface card such as a small computer system interface (SCSI) card, a fibre channel interface card, a universal serial bus (USB) interface card, or an IEEE interface card (IEEE stands for The Institute of Electrical Electronics Engineers). The storage IF 450 functions as a data input/output adapter for coupling the file server 400 to the disk subsystems 500.

Each client server 200 is a computer with a network IF (not shown), for example, a personal computer, a general-purpose server, or a mainframe computer. The client server 200 includes an information input device (not shown) examples of which include a keyboard, a switch, a pointing device, and a microphone, and an information output device (not shown) examples of which include a monitor display and a speaker.

Similarly to the client server 200, each management terminal 100 is a computer with a network IF (not shown), for example, a personal computer, a general-purpose server, or a mainframe computer.

Each disk subsystem 500 includes a CPU 510, a main memory 520, a storage IF 540, and at least one disk drive 530.

The file server 400 and the client server 200 are coupled to the network 300, and hence the file server 400 receives a data access request from the client server 200 and sends a processing result to the client server 200 over the network 300. The network 300 is preferably Ethernet or Fibre Channel. The management terminal 100 is also coupled to the network 300, and hence the file server 400 receives a management access request from the management terminal 100 and sends a processing result to the management terminal 100 over the network 300.

The file server 400 and the disk subsystem 500 are coupled directly or via a network 600. The file server 400 sends a data access request to the disk subsystem 500 and receives a processing result from the disk subsystem 500. A preferred communication protocol for the direct connection or the connection via the network 600 is, for example, Ethernet or Fibre Channel.

The management terminal 100 and the client server 200 may be coupled to two separate networks 300 (e.g., the management terminal 100 is coupled to a management network whereas the client server 200 is coupled to a data network).

Figure 2:
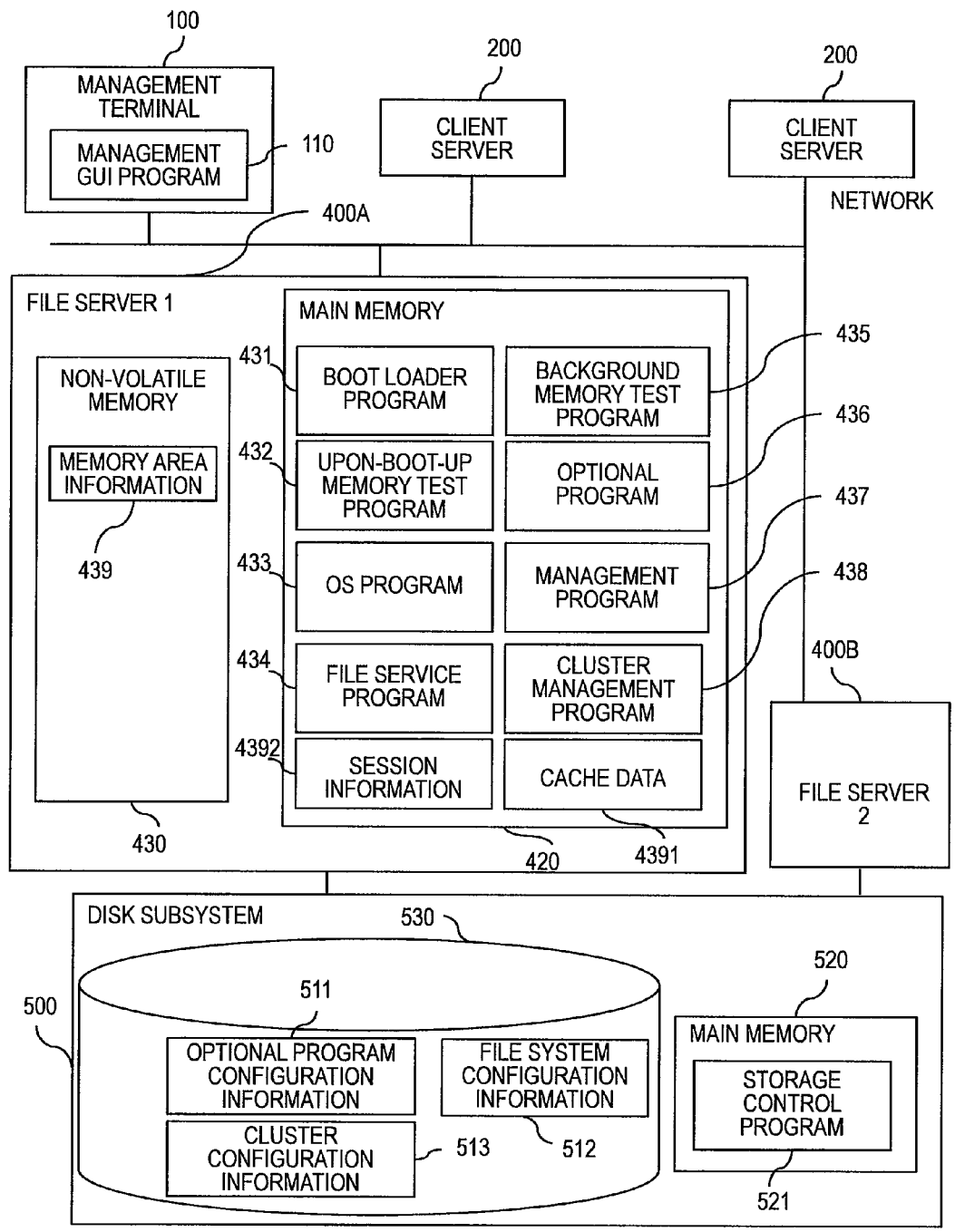
FIG. 2 is a block diagram showing a software configuration of the computer system in accordance with the first embodiment of this invention.

FIG. 2 is a block diagram showing a software configuration of the computer system according to the first embodiment of this invention.

The file server 400 includes a boot loader program 431, an upon-boot-up memory test program 432, an OS program 433, a file service program 434, a background memory test program 435, one or more optional program 436, a management program 437, and a cluster management program 438.

The boot loader program 431 is a program that starts up immediately after the system boot up of the file server 400 is started, and that initializes the constituent hardware and then starts up the OS program 433, which will be described later. When initializing the hardware, the boot loader program 431 instructs the upon-boot-up memory test program 432, which will be described later, to execute a memory test.

The upon-boot-up memory test program 432 is a program that conducts a memory test upon system boot up on a memory area within the main memory 420 that is specified by memory area information 439, which will be described later. The memory test here is a test for checking for a memory error by writing, reading, and cross-checking a plurality of test patterns in a memory test area.

The operating system (OS) program 433 manages the overall operation of the file server 400. After being started up, the OS program 433 instructs the background memory test program 435, which will be described later, to execute a memory test at the same time the file service program 434 starts providing a file service.

The file service program 434 processes a request to access data in a file system which is received from the client server 200. The file system here refers to a method of managing, on a file basis, data that is recorded on a disk drive.

The background memory test program 435 is a program that conducts a memory test on a memory area within the main memory 420 that is specified by the OS program 433. Processing executed by the background memory test program 435 is the same as the one executed by the upon-boot-up memory test program 432.

The optional program 436 is a program that executes processing for improving the reliability and user-friendliness of the file server 400, such as file backup and migration. The management program 437 is a program that instructs the OS program 433 to reflect changed settings in response to a configuration change instruction that the management terminal 100 gives to change the configuration of a file system and the configuration of the optional program 436.

The cluster management program 438 is a program that controls a plurality of file servers 400 in a computer system such that the file servers 400 function as a cluster configuration. The cluster configuration here refers to a configuration in which, when one of the plurality of file servers 400 stops working, another of the file servers 400 takes over a file system that has been managed by the stopped file server 400.

For example, in the case where the first file server 1 (400A) and the second file server 2 (400B) form a cluster, when a failure occurs in the first file server 1 (400A), or when the first file server 1 (400A) is shut down for maintenance, a file system managed by the first file server 1 (400A) is taken over by the other file server that is in operation, namely, the second file server 2 (400B). Forming a cluster from a plurality of file servers 400 can enhance the reliability and availability of the system. It should be noted that a computer system with a plurality of file servers 400 forming a cluster is given merely as an example, and that the first embodiment is applicable also to a computer system in which the file servers 400 do not form a cluster.

In the following description, executing for a function of each implemented program is expressed as 'executed by the "program"'. In actuality, however, it is the CPU 410 instructed by the "program" that executes the processing.

The main memory 420 of the file server 400 stores cache data 4391 and session information 4392. The cache data 4391 is used to avoid accessing the low-speed disk subsystem as much as possible by accumulating frequently used data. The session information 4392 contains account information of the client server 200, network information, and the like, and is stored in the main memory 420 for a given period of time whenever access is requested.

The non-volatile memory 430 of the file server 400 stores the memory area information 439. The memory area information 439 contains information about the state and physical address of each memory area.

The main memory 520 of the disk subsystem 500 stores a storage control program 521. The storage control program 521 is a program that receives, from the file server 400 through the storage IF 450, a request to access data stored in one of the disk drives 530, accesses the disk drive 530 as requested, and sends a response to the file server 400.

Each disk drive 530 of the disk subsystem 500 stores file system configuration information 512, optional program configuration information 511, and cluster configuration information 513. The file system configuration information 512 contains information about the capacity, settings, and the like of a file system. The optional program configuration information 511 contains information about the memory capacity usage, priority level, and the like of the optional program 436. The cluster configuration information 513 contains information necessary for takeover of file systems among a plurality of file servers 400.

The management terminal 100 includes a management GUI program 110. The management GUI program 110 presents windows for setting the file system configuration and the optional program configuration to an administrator of the file server 400. The management GUI program 110 sends a settings change made by the administrator through these setting windows to the file server 400.

In the following description, processing of the management GUI program 110 is performed by the "program". In actuality, however, it is a CPU (omitted from the drawings) of the management terminal 100 instructed by the "program" that executes the processing.

(1-2) Outline of the First Embodiment

An outline of the first embodiment will be given next.

In the first embodiment, upon system boot up, the file server 400 calculates the memory capacity necessary for a file service based on the file system configuration information 512 and the optional program configuration information 511. The memory capacity calculation will be described later with reference to FIG. 10B. The file server 400 uses the result of this calculation to set the memory test capacity upon system boot up to an appropriate value. The system boot up time is thus cut short.

After the OS is started up, the background memory test program 435 tests a memory area in the main memory 420 at the same time the file service program 434 starts providing a file service. This enables the file server 400 to start using the main memory 420 promptly, beginning with a memory area that has finished being tested.

The above-mentioned processing will be outlined with reference to FIGS. 3A and 3B as an application example of the first embodiment.

FIG. 3A is an explanatory diagram outlining a memory test in a file server according to the first embodiment of this invention.

The file server 400 of FIG. 3A includes four file systems (FS1, FS2, FS3, and FS4). FIG. 3A shows, as an example, time points at which the respective memory areas finish a memory test executed after system boot up, and programs and data stored in the memory.

The file server 400 calculates, in advance, as the size of an upon-boot-up memory test necessary for the set file service level, 1 gigabyte (GB) for the OS, 2 GB for storing the cache data 4391, 0.5 GB for storing the session information 4392, and 0.5 GB for the optional program 436, which are 4 GB in total.

1 GB here for the OS is the memory capacity necessary for storing and running the OS program 433, the background memory test program 435, and the file service program 434. 2 GB for storing the cache data 4391 is the sum of values obtained by multiplying the capacities of the file systems (FS1, FS2, FS3, and FS4) by a coefficient that is determined from whether or not data written in the storage has been updated (in other words, which of asynchronous write and synchronous write is executed).

Asynchronous write is write processing that controls the file server 400 such that, when receiving a data write request from the client server 200 and after storing the requested data in the main memory 420, the file server 400 sends a response (acknowledgement), irrespective of whether the requested data is stored in the disk drive 530 or not. Synchronous write is write processing that controls the file server 400 such that, when receiving a data write request from the client server 200, the file server 400 does not send an acknowledgement until finishing storing the requested data in the main memory 420 and then in the disk drive 530.

In the example of FIG. 3A, the file server 400 is set to execute asynchronous write in FS1 and FS2 and synchronous write in FS3 and FS4.

For instance, FS1 to FS4 each have a file capacity of 400 GB, and the cache data amount for FS1 and FS2 each where asynchronous write is executed is 0.4 GB which is obtained by multiplying the file capacity, 400 GB, by 0.1%, whereas the cache data amount for FS3 and FS4 each where synchronous write is executed is 0.6 GB which is obtained by multiplying the file capacity, 400 GB, by 0.15%. The cache data amount for FS1 to FS4 in total is therefore 2 GB.

0.5 GB for storing the session information 4392 is a value obtained by estimating the count of connection sessions from the combined capacity of FS1 to FS4, and calculating the product of the estimated value and the capacity required to store information of one session. In the above-mentioned example, 0.5 GB is calculated by estimating the session count as 1,600 sessions from the combined capacity of FS1 to FS4, 1,600 GB, and multiplying this session count by the necessary capacity per session, 125 kilobytes (KB).

The area for the optional program started up upon system boot up is the sum of different memory capacities which differ from one type of operational program to another. In this example, a backup program is started up upon system boot up and 0.5 GB needed by the backup program is the necessary capacity. The values used in this example to estimate the size of an upon-boot-up memory test are given merely as an example, and may be replaced by values suited to the mode of the file server.

Described next is a process of performing a memory test on each memory area in the main memory 420 separately.

First, as an upon-boot-up memory test, the file server 400 starts the memory test of boot up memory areas 1 and 2 at 16:58 and completes the test at 17:00. This upon-boot-up memory test is conducted by the upon-boot-up memory test program 432 on the memory capacity necessary to start a file service which is calculated in advance. The file server 400 starts up the OS program 433 using the memory areas 1 and 2 which has been tested by the upon-boot-up memory test.

Thereafter, the OS program 433 starts up the file service program 434, which is necessary to provide a file service, and the background memory test program 435. The memory capacity of the memory areas 1 and 2 is determined from the memory capacity usage of the OS program 433 and the capacity settings of the file systems, and hence lowering of performance and system shutdown due to a shortage of memory capacity are avoided. Of the memory areas 1 and 2, the unoccupied area later stores the optional program 436, the cache data 4391, and the session information 4392.

Next, the OS program 433 instructs the background memory test program 435 to execute a memory test in the background. As the background memory test, the test of a memory area 3, the test of a memory area 4, and the test of a memory area 5 are completed at 17:05, 17:10, and 17:15, respectively.

FIG. 3B is an explanatory diagram showing an event and a state at each time point in a memory test according to the first embodiment of this invention.

FIG. 3B shows that, in the application example of the first embodiment, the boot loader state, the OS state, and the state of the optional program 436 (e.g., backup program) change at each event that occurs in a period between the time the system is powered on and the time the memory test is completed, thus increasing the cache data amount and the maximum concurrent connection count.

(1-3) Memory Test Method of the First Embodiment

Figure 4:
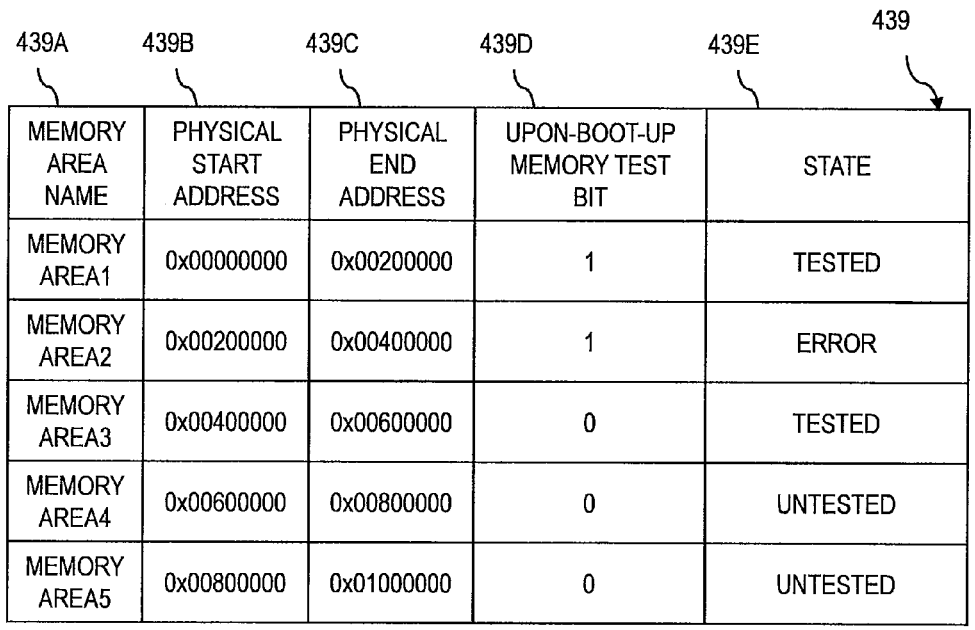
FIG. 4 is an explanatory diagram showing a memory area information table in accordance with the first embodiment of this invention.

FIG. 4 is an explanatory diagram showing a memory area information table according to the first embodiment of this invention.

The memory area information 439 contains configuration information of each memory area in the main memory 420 installed in the file server 400. Specifically, the memory area information 439 contains, for each memory area, a memory area name 439A, a physical start address 439B, a physical end address 439C, an upon-boot-up memory test bit 439D, and a state 439E.

The memory area name 439A is the name of the memory area. The physical start address 439B is a physical address at which the memory area begins. The physical end address 439C is a physical address at which the memory area ends. The upon-boot-up memory test bit 439D indicates whether to conduct a memory test on the memory area upon system boot up. The value of the upon-boot-up memory test bit 439D is "1" when a memory test is to be conducted upon boot up, and "0" when a memory test is not to be conducted upon boot up.

The state 439E indicates whether or not the memory area has been tested and whether or not an error has been detected.

In the first embodiment, the state 439E can have one of three values, "tested", "untested", and "error". "Tested" indicates that the test of the memory area has been completed. "Untested" indicates that the memory area has not been tested yet. "Error" indicates that an error has been detected as a result of testing the memory area.

Figure 5:
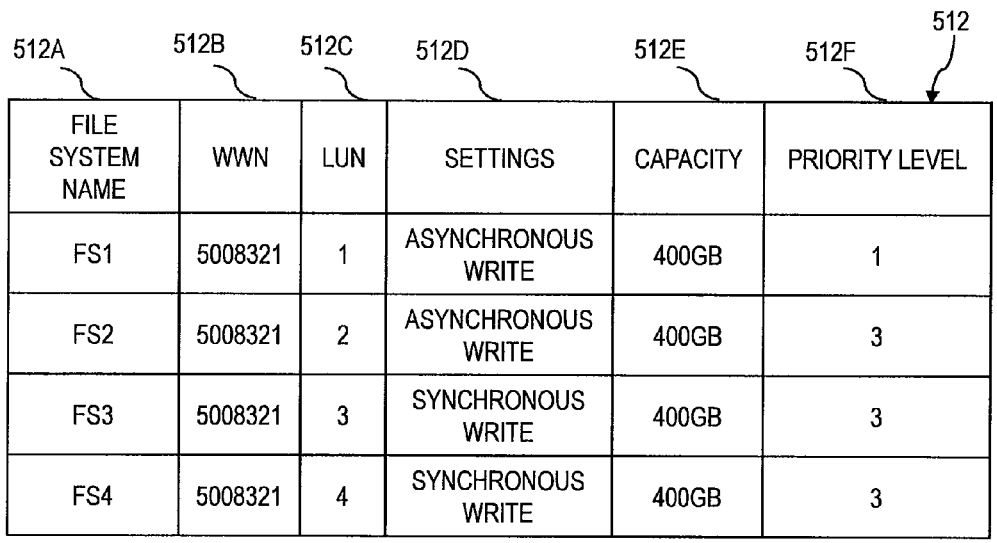
FIG. 5 is an explanatory diagram showing a file system configuration information table in accordance with the first embodiment of this invention.

FIG. 5 is an explanatory diagram showing a file system configuration information table according to the first embodiment of this invention.

The file system configuration information 512 contains, for each file system managed by the file server 400, a file system name 512A, a world wide name (WWN) 512B, a logical unit number (LUN) 512C, settings 512D, a capacity 512E, and a priority level 512F.

The file system name 512A is the name of the file system. The WWN 512B is the address of a port of the storage IF 540 in the disk subsystem 500 to which a logical unit (LU) storing the file system belongs. A port of the storage IF 540 can uniquely be identified by WWN. The LUN 512C is the identification number of the LU that stores the file system. The LUN 512C is used to identify an LU within a port to which the LU belongs.

The settings 512D are settings about the operation of the file system. In this example, which of "synchronous write" or "asynchronous write" is to be executed when the file server 400 receives update data from the client server 200 is set as the settings 512D. The settings are set by the administrator through the management terminal 100.

The capacity 512E is the capacity of the file system. The priority level 512F indicates the priority level of the file system. A file system having a high priority level is given priority in the execution of failover upon failure or for maintenance. Failover here refers to processing of switching the file system that is now running from the file server 400 that has created a file system to another file server 400. The highest priority level is "1".

FIG. 6 is an explanatory diagram showing an optional program configuration information table according to the first embodiment of this invention.

The optional program configuration information 511 contains, for each optional program 436, an optional program name 511A, memory capacity usage 511B, and a priority level 511C. The optional program name 511A is the name of the optional program 436. The memory capacity usage 511B indicates the memory capacity necessary to run the optional program 436. The priority level 511C indicates the priority level of the optional program 436. The highest priority level is "1".

The OS program 433 determines when to start up the optional program 436 based on the priority level 511C. In the first embodiment, the optional program 436 that has a priority level "1" is started up when the OS is booted up, the optional program 436 that has a priority level "2" is started up when the background memory test program 435 finishes the memory test of a memory area that is first in line, and the optional program 436 that has a priority level "3" is started up when the background memory test program 435 finishes the memory test of a memory area that is second in line.

The administrator (or user) can change the priority level 511C of the optional program 436 to suit the file server running environment employed. The optional program 436 that is given a priority level "1" to be started up upon OS boot up is a program necessary to start providing a file service. Other programs necessary to start providing a file service include ones that are started up, irrespective of what settings are set by the administrator (or user) (e.g., OS program 433). The optional program 436 that is given a priority level "2" or "3" is a program started up after the file server 400 starts providing a file service.

FIG. 7 is an explanatory diagram showing a cluster configuration information table according to the first embodiment of this invention.

The description given here on the cluster configuration information 513 takes as an example a cluster constituted of the first file server 1 (400A) and the second file server 2 (400B) shown in FIG. 1. The first embodiment, however, is also applicable to the case where the file servers 400 do not form a cluster configuration.

The cluster configuration information 513 contains, for each file system, a file system name 513A, an affiliated file server 513B, and an operating file server 513C. The file system name 513A is the name of the file system. The affiliated file server 513B indicates the file server 400 to which the file system belongs. The affiliated file server 513B is the file server 400 that has created the file system. Usually, a file system runs on its affiliated file server. Here, when a file system runs on one file server 400, it means that this file server 400 processes a request made by the client server 200 to access data in the file system.

The operating file server 513C indicates the file server 400 where the file system is running at that point. The affiliated file server of a file system and the operating file server of the file system are usually the same. When failover is executed upon failure or for maintenance, the operating file server 513C is the file server 400 that takes over the file system after failover.

The following is a description on specifics of processing executed by the respective components in the first embodiment. The description will be given with reference to flow charts of FIGS. 8 to 10B.

Figure 8:
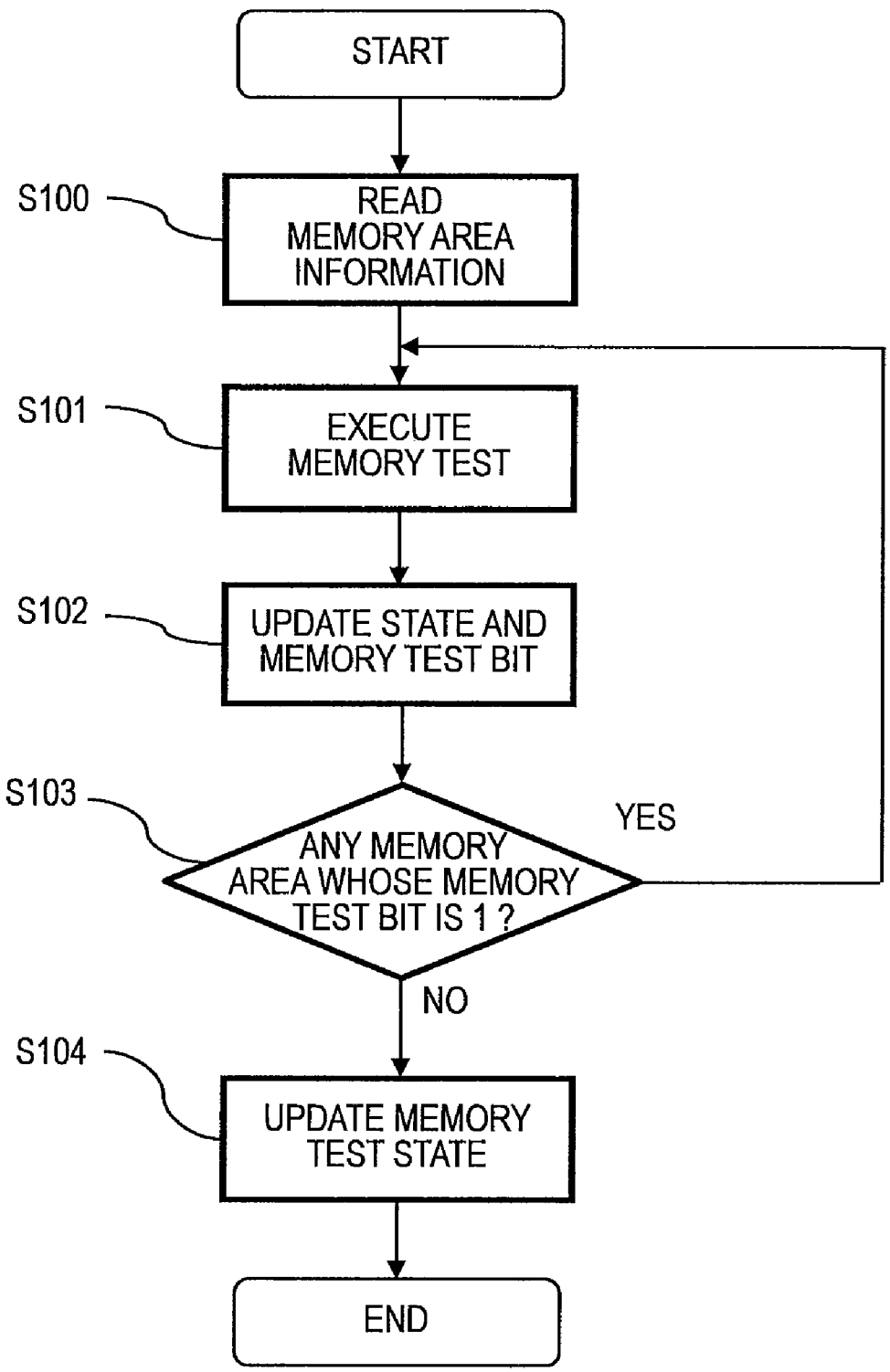
FIG. 8 is a flow chart showing processing that is executed by a boot loader program in the first memory check in accordance with the first embodiment of this invention.

FIG. 8 is a flow chart showing processing that is executed by the boot loader program 431 in a boot memory test according to the first embodiment of this invention.

First, the boot loader program 431 reads the memory area information 439 out of the non-volatile memory 430 (S100), and chooses as a processing object a boot memory area specified by the upon-boot-up memory test bit 439D in the memory area information 439. In this step, the value of the state 439E in the memory area information 439 may be initialized and then "untested" may be registered as the state 439E for every memory area.

The boot loader program 431 instructs the upon-boot-up memory test program 432 to execute a memory test for the specified boot memory area (i.e., memory area with "1" registered as the upon-boot-up memory test bit 439D). The upon-boot-up memory test program 432 executes the memory test of the specified boot memory area (S101).

The memory test here refers to checking whether expected values are correctly written at the respective bits by writing, reading, and cross-checking predetermined test patterns in a physical memory medium that constitutes the memory area.

When the memory test is finished normally, the boot loader program 431 registers "tested" as the state 439E of the memory area that has completed the memory test (S102). When an error occurs during the memory test, on the other hand, the boot loader program 431 registers "error" as the state 439E of the memory area where the error has occurred (S102).

If necessary, the upon-boot-up memory test program 432 may sends an error message to the boot loader program 431 upon detection of an error in a boot memory area during an upon-boot-up memory test. Receiving the error message, the boot loader program 431 may notify the management terminal 100 of the error state of the boot memory area along with the physical address of the boot memory area, thereby alerting the administrator to the need to replace the physical memory medium.

Then, the boot loader program 431 selects a memory area as large as or larger than the memory area where the error has occurred out of memory areas that are not boot memory areas whose state 439E is "untested", and updates the upon-boot-up memory test bit 439D of this memory area to "1" (S102).

Next, the boot loader program 431 judges whether or not there are any "untested" memory areas whose upon-boot-up memory test bit 439D is "1" (S103). When there is an "untested" memory area whose upon-boot-up memory test bit 439D is "1", the boot loader program 431 starts the test of this memory area (S101). The boot loader program 431 conducts a memory test on the memory area whose upon-boot-up memory test bit 439D is newly updated to "1" due to the error in the boot memory area. When the tested memory area is normal, this memory area is allocated as a memory area necessary to provide a file service upon system boot up.

When there is no "untested" memory area whose upon-boot-up memory test bit 439D is "1", the boot loader program 431 judges that the upon-boot-up memory test has been completed, and ends the processing, letting the state 439E remain as "untested" for memory areas that have not been tested (S104). Thereafter, the boot loader program 431 starts booting up the OS.

Through the above-mentioned processing, the boot loader program 431 designates as test subjects only memory areas that are specified by the memory area information 439, and can hand over the test of other memory areas which are not specified by the memory area information 439 to the OS program 433.

Figure 9:
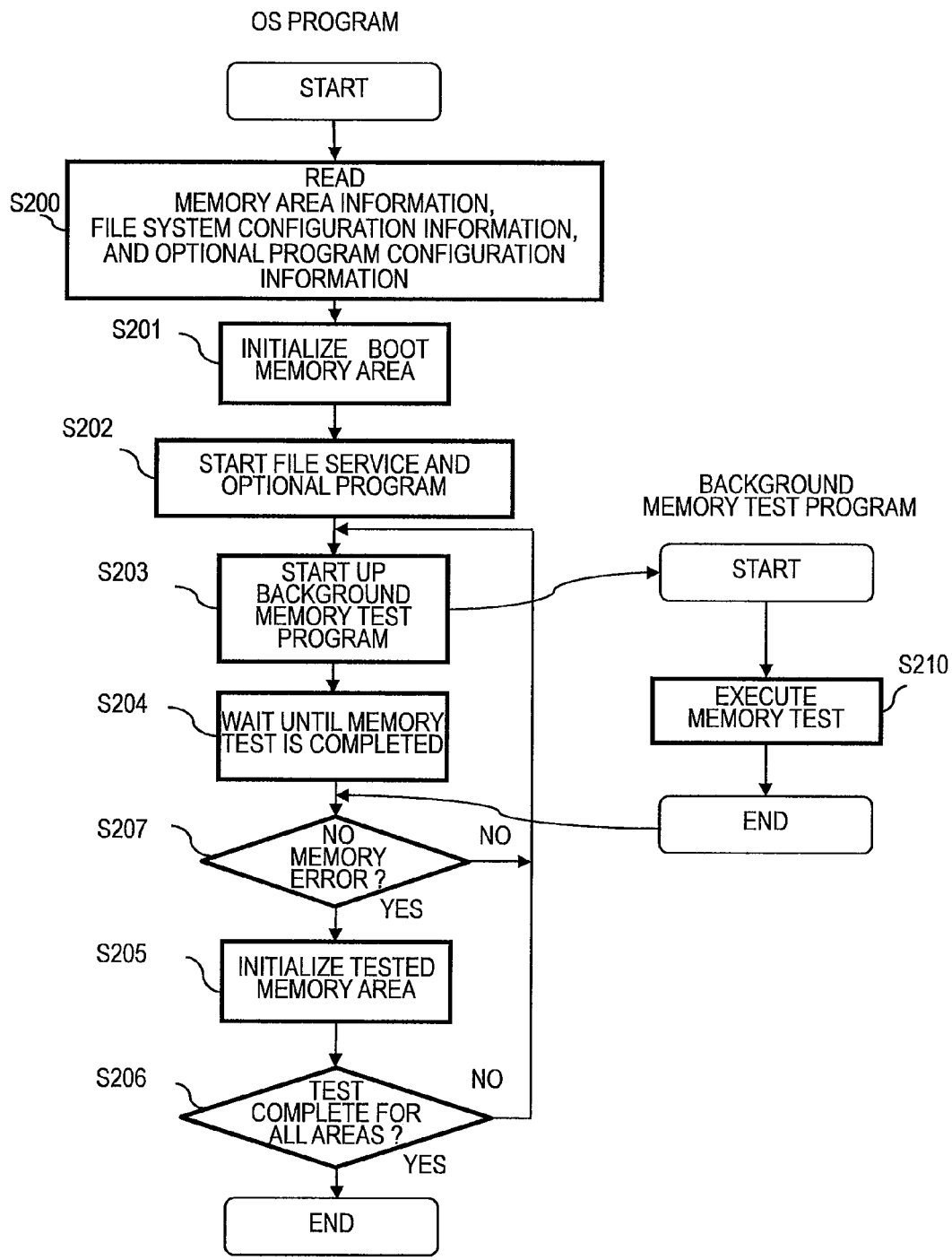
FIG. 9 is a flow chart showing processing that is executed by an OS program and a background memory test program during a background memory test in accordance with the first embodiment of this invention.

FIG. 9 is a flow chart showing processing that is executed by the OS program 433 and the background memory test program 435 during a background memory test according to the first embodiment of this invention.

After booted up, the OS program 433 reads the memory area information 439 in the non-volatile memory 430, and the optional program configuration information 511 and the file system configuration information 512 in the disk subsystem 500 (S200). The OS program 433 checks the state 439E in the memory area information 439 to initialize memory areas that have finished a memory test (excluding memory areas for the OS) (S201), thereby making the memory areas available for storage of various optional programs 436 such as a backup program, the cache data 4391, and the session information 4392.

The OS program 433 in this step may not initialize a memory area whose state 439E is "error" and may instead notify the management terminal 100 of the error state of this memory area along with the physical address of the memory area, thereby alerting the administrator to the need to replace the physical memory medium.

Next, the OS program 433 examines the file system configuration information 512 and starts up the file service program 434. The OS program 433 also reads the optional program configuration information 511 to start up the optional program 436 whose priority level 511C is "1" (S202).

Then, the OS program 433 starts up the background memory test program 435 and instructs the background memory test program 435 to start the test of "untested" memory areas (S203).

Receiving the instruction, the background memory test program 435 executes a memory test for a memory area specified by the OS program 433 (S210). The background memory test program 435 sends an error message to the OS program 433 when a memory error is detected.

While the background memory test program 435 is conducting the test, the OS program 433 stands by until a memory test completion notification is received (S204). After the background memory test program 435 completes the memory test, the OS program 433 judges whether or not the tested memory area is experiencing an error (S207).

When it is judged in Step S207 that the tested memory area is not experiencing an error, the OS program 433 initializes this memory area. The initialized memory area is used as an area for storing the cache data 4391 and the session information 4392 (S205). When it is judged in Step S207 that the tested memory area is experiencing an error (when the background memory test program 435 returns an error message), the OS program 433 notifies the management terminal 100 of the error state of the memory area along with the physical address of the memory area, thereby alerting the administrator to the need to replace the physical memory medium.

The OS program 433 continues testing to conduct a memory test on the next memory test area ("untested" memory area). The OS program 433 then judges whether or not the test of all memory test areas has been completed (S206). When there are any memory areas left "untested", the OS program 433 continues the memory test (S203), and ends the memory test when the test of all memory areas is completed.

Through the above-mentioned processing, the OS program 433 conducts a memory test in the background while providing a file service simultaneously, thus making a memory area available for the file service as soon as the memory test of the memory area is completed.

The alert sent to the management terminal 100 may contain information that distinguishes an error detected by the upon-boot-up memory test program 432 and an error detected by the background memory test program 435 from each other such that the administrator can recognize malfunctioning of a physical memory medium with ease. Receiving an alert containing this information, the management terminal 100 may display errors in a manner that distinguishes the former error from the latter.

Figure 10A:
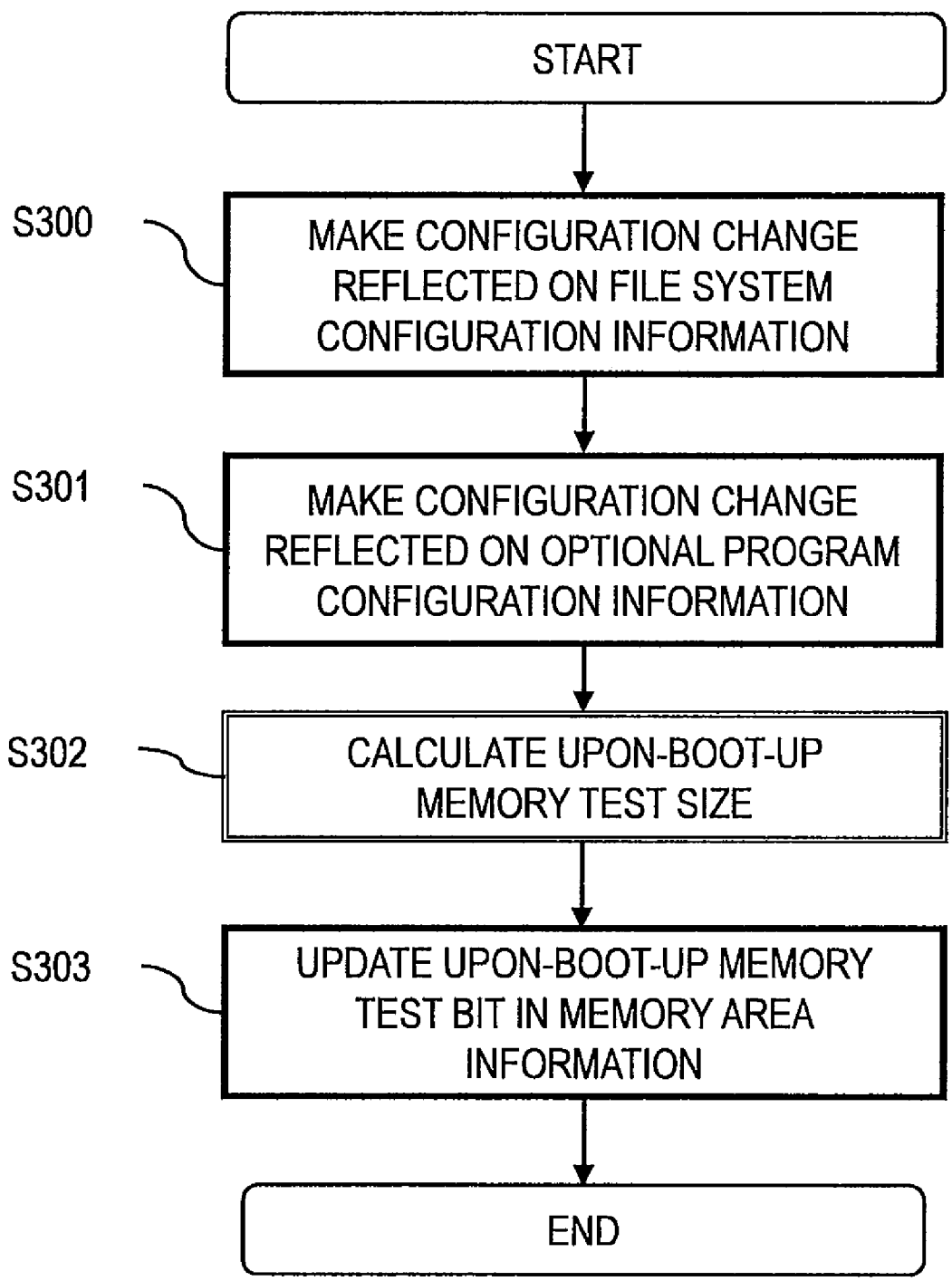
FIG. 10A is a flow chart showing processing that is executed by a management program to change a file system configuration in accordance with the first embodiment of this invention.

FIG. 10A is a flow chart showing processing that is executed by the management program 437 to change the file system configuration according to the first embodiment of this invention.

The management program 437 receives an instruction to change the file system configuration, such as the creation or deletion of a file system, from the management terminal 100, and updates the file system configuration information 512 to match the instructed change (S300).

Next, the management program 437 receives an instruction to change the optional program configuration from the management terminal 100, and updates the optional program configuration information 511 to match the instructed change (S301).

Then, the management program 437 calculates the memory capacity needed upon the booting up of the entire system (upon-boot-up memory test size) from the file system configuration information 512 and the optional program configuration information 511 (S302). How this memory capacity is calculated will be described later with reference to FIG. 10B.

Based on the memory capacity needed upon system boot up which is estimated by the calculation of Step S302, the management program 437 determines memory areas to be tested upon system boot up, and updates the upon-boot-up memory test bit 439D in the memory area information 439 (S303).

Figure 10B:
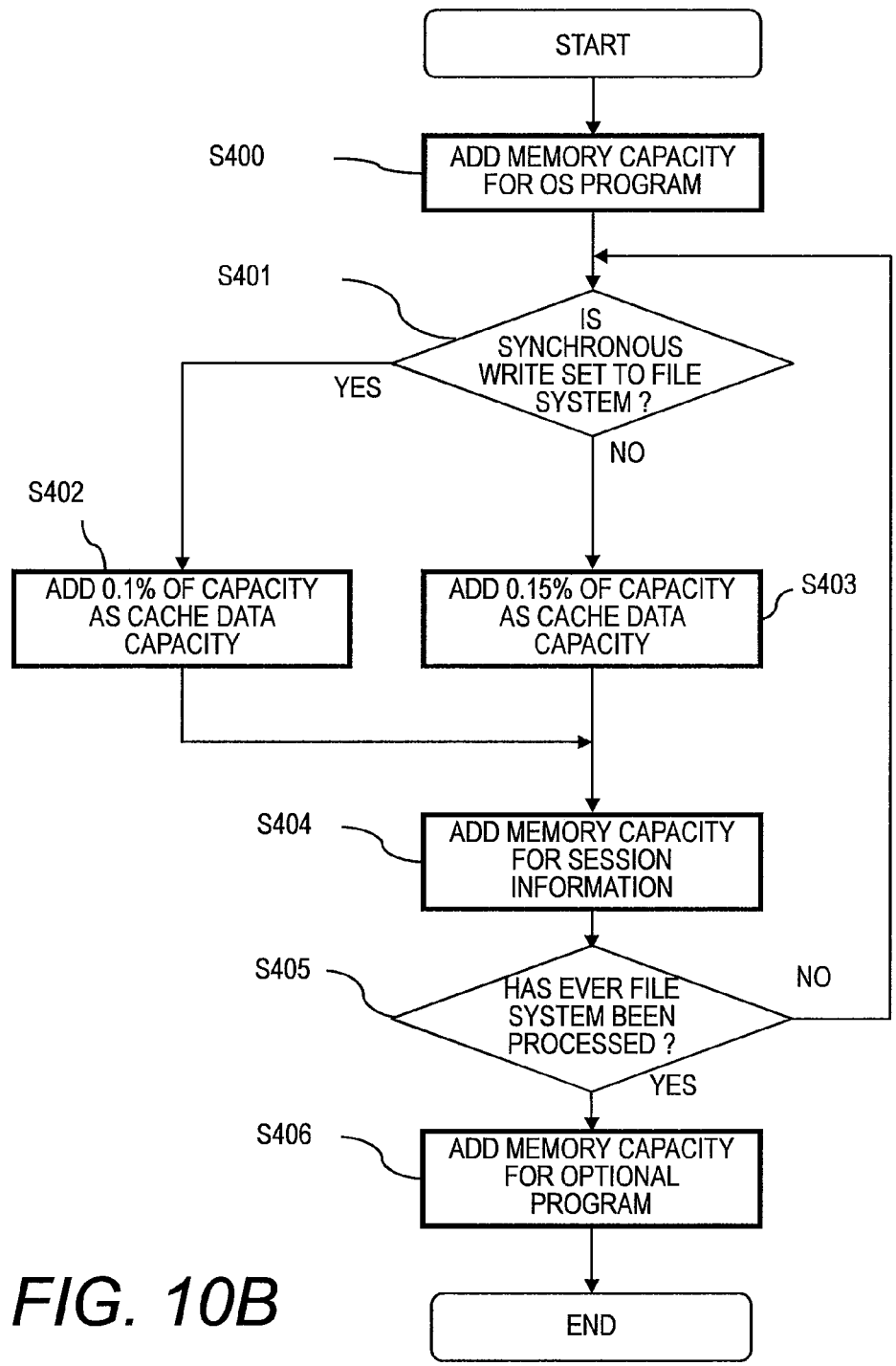
FIG. 10B is a flow chart showing a method of calculating a upon-boot-up memory capacity when the file system configuration is changed in accordance with the first embodiment of this invention.

FIG. 10B is a flow chart showing a method of calculating the upon-boot-up memory capacity when the file system configuration is changed according to the first embodiment of this invention.

The management program 437 calculates the upon-boot-up memory test capacity from the sum of the memory capacity for the OS (memory capacity for the OS program 433, file service program 434, and background memory test program 435), the memory capacity for storing the cache data 4391 and session information 4392 of the file systems, and the memory capacity for the optional program 436.

First, the management program 437 adds, as the memory capacity for the OS, to the upon-boot-up memory test capacity, a given memory capacity necessary for the OS program 433, the file service program 434, and the background memory test program 435 to operate (S400). The memory capacity for the OS is 1 GB in the first embodiment.

Next, the management program 437 judges whether or not synchronous write is set to a file system (S401). When it is judged that synchronous write is set to this file system, the management program 437 adds, as the capacity for cache data, to the upon-boot-up memory test capacity, 0.1% of the capacity of this file system (S402). When it is judged that synchronous write is not set to this file system (when asynchronous write is set to this file system), the management program 437 adds 0.15% of the capacity of this file system to the upon-boot-up memory test capacity (S403). The ratios (%) used in the calculation of the memory capacity for cache data in the first embodiment are given merely as an example, and may be replaced by values suited to the employed file server running environment.

The management program 437 calculates the capacity for storing the session information 4392. Specifically, the management program 437 calculates, as the capacity for storing the session information 4392, the product of the count of client sessions used per gigabyte of file system capacity and the memory capacity necessary for one client session, and adds the calculated value to the upon-boot-up memory test capacity (S404). In the first embodiment, one client session is used per gigabyte of file system capacity and a memory capacity of 125 kilobytes (KB) is necessary for one client session. These specific values are given merely as an example, and may be replaced by values suited to the employed file server running environment.

Next, the management program 437 judges whether or not the calculation has been completed for every file system (S405). When not all of the file systems have finished the calculation, the management program 437 performs the calculation for the remaining file systems (S401).

When the calculation is completed for every file system, the management program 437 adds the memory capacity necessary for the optional program 436 to the upon-boot-up memory test capacity (S406). The memory capacity necessary for the optional program 436 here is the sum of values registered as the memory capacity usage 511B in the optional program configuration information 511 for the optional programs 436 whose priority level 511C is "1".

Through the above-mentioned processing, the management program 437 calculates the necessary memory capacity based on the file system configuration and the optional program configuration, and makes the calculation result reflected on the memory area information 439. The file server 400 can therefore perform an upon-boot-up memory test only for the necessary memory capacity. This effect is not undermined by a change in configuration of the optional program 436 since the management program 437 calculates the memory capacity for the optional program 436 based on the changed optional program configuration information 511.

According to the memory test method of the first embodiment, the file server 400 can thus conduct a memory test upon system boot up only on necessary memory areas which are determined based on the file system configuration and the optional program configuration. The file server 400 can thus finish an upon-boot-up memory test in minimum time regardless of the large capacity of the installed memory.

The first embodiment uses the file system capacity, file system settings (which of synchronous write or asynchronous write is set), and information on the presence or absence of the optional program 436 in calculating the memory test capacity upon system boot up. This is, however, merely an example and the memory test capacity may be calculated from other parameters such as the count of virtual file servers running on the file server 400 and a file meta data storage capacity, which is determined by the count of files used.

The virtual servers here are file servers that virtually run on one physical file server 400. The file server 400 may be divided into a plurality of virtual file servers, and the divided virtual file servers each may provide a file service. In this case, a plurality of virtual file servers obtained by the division may be started up in an order determined by the capacities of memory areas that have finished the memory test, and the started up virtual file server may begin providing a file service.

Meta data refers to management information such as a path name, which is necessary for file management but which is not the data body. The meta data storage capacity increases as the count of files rises. To calculate the memory test capacity, for example, a capacity obtained by multiplying a given necessary memory capacity per virtual file server by the count of the virtual file servers may be added, or the memory capacity necessary to store file meta data may be calculated by multiplying the file meta data storage capacity by a given ratio (%).

Storing the memory area information 439 in the non-volatile memory 430 is merely an example, and the memory area information 439 may be stored in the disk subsystem 500 instead. Also, registering in the memory area information 439 in advance for each memory area whether or not an upon-boot-up memory test has been conducted is merely an example. Instead, the boot loader program 431 may calculate the necessary memory capacity based on various types of settings information upon system boot up prior to the memory test.

In the memory test method of the first embodiment, the CPU 410 writes test patterns but it is merely an example. The memory test pattern writing may instead be offloaded to other hardware components of the file server such as a direct memory access (DMA) engine.

Second Embodiment

A second embodiment of this invention will be described with reference to FIGS. 1 and 2 and FIGS. 11 to 12C.

(2-1) Configuration of a Computer System according to the Second Embodiment

The computer system configuration according to the second embodiment is the same as the computer system configuration according to the first embodiment which is illustrated in FIGS. 1 and 2. The computer system of the second embodiment includes at least two file servers 400, which form a cluster. The second embodiment differs from the computer system of the first embodiment in that the cluster management program 438 dynamically switches the file system operating file server 400 based on the memory capacity that becomes available after the memory test conducted simultaneously with the start of a file service is completed.

In the following description, a cluster is formed from two file servers, the file server 1 (400A in FIGS. 1 and 2) and the file server 2 (400B in FIGS. 1 and 2) for simplification. The second embodiment is also applicable to the case where at least two file servers form a cluster.

(2-2) Outline of the Second Embodiment

In the first embodiment, while the boot up time is cut short by limiting memory areas to be tested upon system boot up to necessary areas, the memory capacity available immediately after system boot up is smaller than in the normal operation of the system. Therefore, when the file server 400 runs as many file systems as in the normal operation in this state, the relatively small memory capacity may hinder the system from reaching an expected performance level. However, increasing the upon-boot-up memory test capacity to improve the performance immediately after system boot up prolongs the boot up time, which conflicts with the original purpose of shortening the system boot up time by minimizing the memory test time upon system boot up.

The second embodiment solves this problem by dynamically switching the operating file server 400 between the file server 1 (400A) and the file server 2 (400B) based on the available memory capacity. The file server 1 (400A) where a memory test is conducted hands over all file systems belonging to itself to the other file server, the file server 2 (400B), through failover upon reboot prior to the memory test. Thereafter, the file server 1 (400A) conducts an upon-boot-up memory test by the method described in the first embodiment, and then fails back only some of the file systems from the file server 2 (400B) to which the file server 1 (400A) has failed over.

Then, the file server 1 (400A) starts providing a file service only with the failed back file systems. The file server 1 (400A) subsequently fails back one file system at a time from the file server 2 (400B) in step with the progress of the memory test. This processing enables the file server 400 to dynamically change the file system count to suit the available memory capacity and thus make the load lighter than in the normal operation when the memory capacity usage is small, with the result that lowering of performance is reduced.

Failover here refers to processing of switching the file system operating file server 400 from the affiliated file server 400 to another file server 400. Failback here refers to processing of switching the file system operating file server 400 back to the affiliated file server 400. Reboot refers to processing of booting up a system immediately after the system is shut down.

Next, an application example of the second embodiment will be described.

Figure 11:
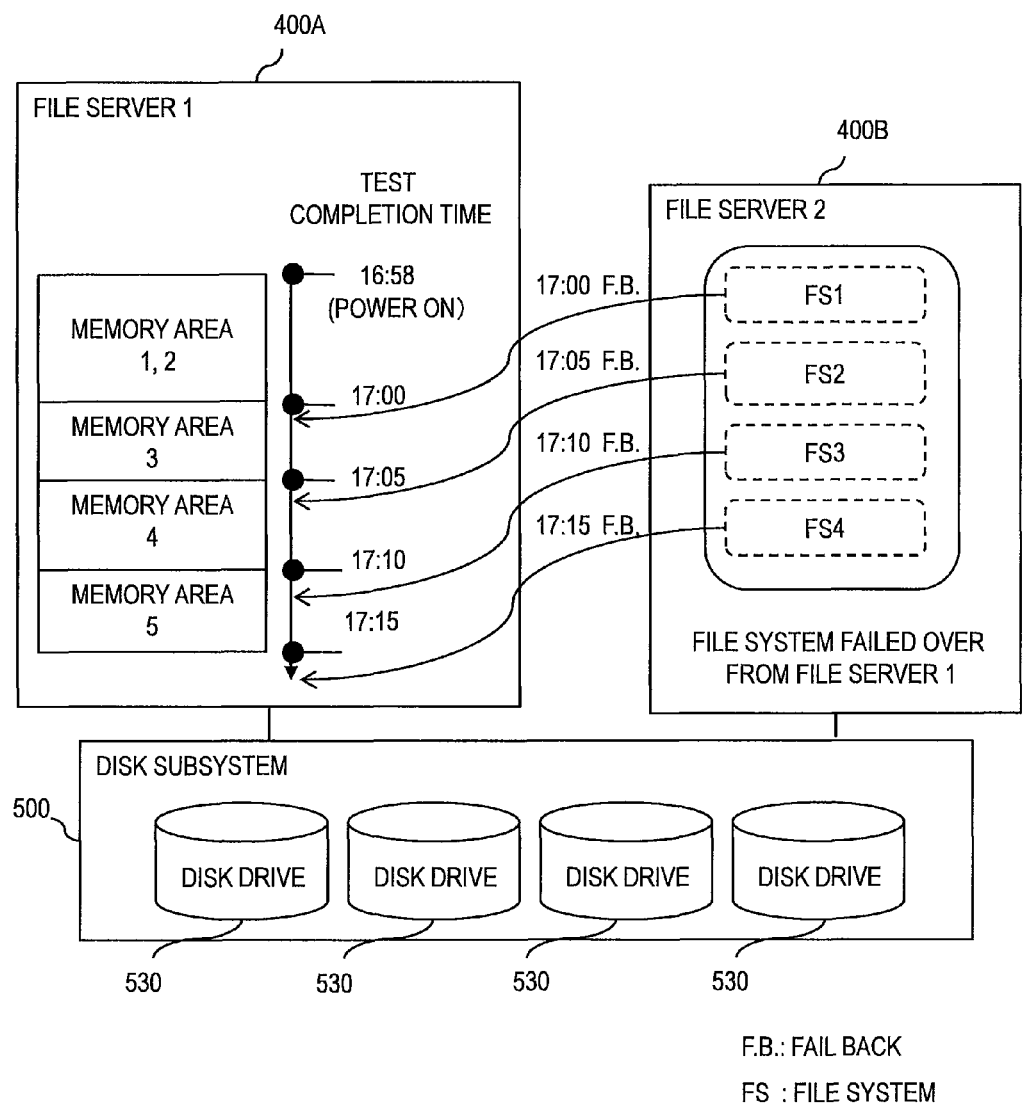
FIG. 11 is an explanatory diagram outlining a memory test and failback in file servers in accordance with the a second embodiment of this invention.

FIG. 11 is an explanatory diagram outlining a memory test and failback in file servers according to the second embodiment of this invention.

In the application example of FIG. 11, the file server 1 (400A) is rebooted after file systems belonging to the file server 1 (400A) are failed over to the file server 2 (400B), and then the file server 1 (400A) conducts a memory test. FIG. 11 shows time points at which the respective memory areas finish the memory test and time points at which the respective file systems are failed back with the completion of the memory test as a trigger.

First, the file server 1 (400A) starts booting up the system at 16:58 and executes an upon-boot-up memory test by the same method as that employed in the first embodiment. The file server 1 (400A) starts the test of the memory areas 1 and 2 (16:58), and ends the test at 17:00. Next, the file server 1 (400A) starts up various programs using the memory areas 1 and 2.

Next, the file server 1 (400A) fails back the file system 1 (FS1) from the file server 2 (400B) to start providing a file service. Since the count of failed back file systems is determined in this step based on the memory capacity available to the file server 1 (400A), a performance can be prevented from dropping lower than in the normal operation. Starting the file service, the file server 1 (400A) conducts a memory test in the background. The file server 1 (400A) conducts the memory test on each memory area separately and, as soon as the memory test of each memory area is completed, initializes the memory area, and fails back a file system from the file server 2 (400B) to start providing a file service using the initialized memory area.

In these failback steps, the file server 1 (400A) determines the count of file systems to be failed back based on the memory capacity that has been made available. A serious performance drop is thus avoided.

In the application example of the second embodiment, the file server 1 (400A) fails back the file system 2 (FS2) after the memory test of the memory test area 3 is completed at 17:05, fails back the file system 3 (FS3) after the memory test of the memory test area 4 is completed at 17:10, and fails back the file system 4 (FS4) after the memory test of the memory test area 5 is completed at 17:15.

(2-3) Memory Test Method according to the Second Embodiment

The description given below is about differences between the second embodiment and the first embodiment.

Figure 12A:
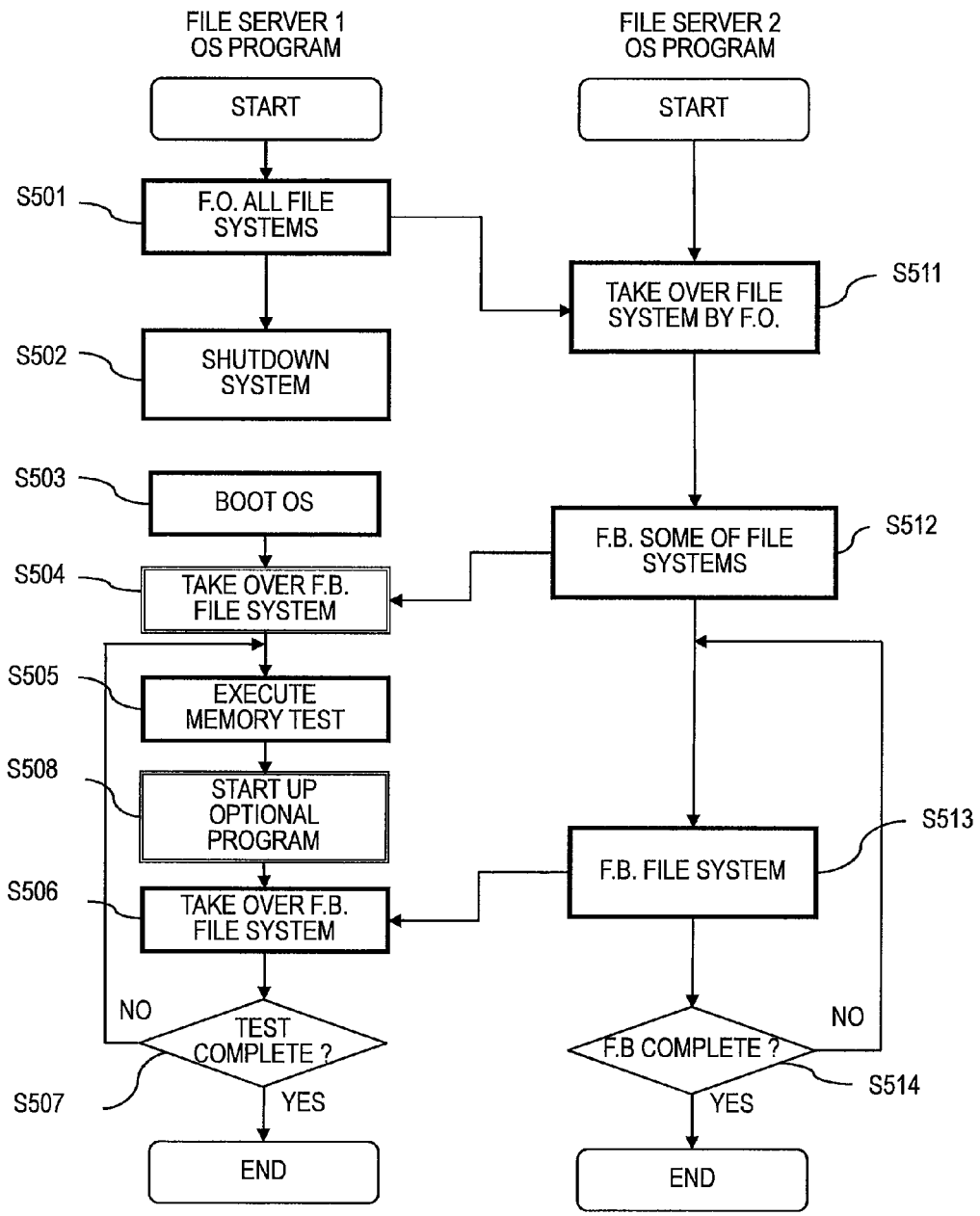
FIG. 12A is a flow chart showing processing that is executed by an OS program to reboot a file server in accordance with the second embodiment of this invention.

FIG. 12A is a flow chart showing processing that is executed by the OS program 433 to reboot a file server according to the second embodiment of this invention.

FIG. 12A shows specifics of processing executed by the OS program 433 of the file server 1 (400A) and specifics of processing executed by the OS program 433 of the file server 2 (400B) in the processing of rebooting the file server 1 (400A).

Prior to system shutdown, the OS program 433 of the file server 1 (400A) instructs the cluster management program 438 to execute file system failover and, receiving the instruction, the cluster management program 438 hands over all file systems (FS1, FS2, FS3, and FS4) belonging to the file server 1 (400A) to the file server 2 (400B) through failover (S501). The OS program 433 of the file server 2 (400B) takes over the file systems from the file server 1 (400A) (S511), and starts providing file services of the handed-over file systems.

Next, the OS program 433 of the file server 1 (400A) shuts down the system (S502). The boot loader program 431 of the file server 1 (400A) boots up the system through the same steps as those employed in the first embodiment, and starts up the OS program 433, which in turn starts up the OS (S503). When the system is booted up, an upon-boot-up memory test is executed. Steps of this and other processing executed at this point are the same as in the first embodiment, and their descriptions will not be repeated.

The OS program 433 of the file server 2 (400B) detects the start up of the OS in the file server 1 (400A) and then fails back at least one file system to the file server 1 (400A) (S512). The OS program 433 of the file server 1 (400A) takes over the file system(s) (S504).

A file system to be failed back in this step is determined automatically by the priority level 512F written in the file system configuration information 512. The OS program 433 of the file server 1 (400A) instructs the background memory test program 435 to execute a memory test by the same method as that employed in the first embodiment (S505). Steps of this and other processing executed at this point are the same as in the first embodiment, and their descriptions will not be repeated.

Next, the OS program 433 of the file server 1 (400A) starts up the optional programs 436 with the completion of the memory test of the respective memory areas as a trigger (S508). Which optional program 436 is to be started up in this step is determined automatically from the available memory capacity and the memory capacity usage of the respective optional programs 436. Details of these processing steps will be described later with reference to FIG. 12B.

Next, the OS program 433 of the file server 2 (400B) fails back some of the file systems (S513). The OS program 433 of the file server 1 (400A) takes over the failed over file systems (S506). A file system to be failed back in this step is determined automatically from the available memory capacity and the memory capacity usage of the respective file systems. Details of these processing steps will be described later with reference to FIG. 12C.

The OS program 433 of the file server 2 (400B) continues the processing until every file system that has been handed over through failover is failed back, and ends the processing after failback of all of the file systems is completed (S514).

The OS program 433 of the file server 1 (400A) continues the above-mentioned processing until the memory test of every area in the main memory 420 is completed, and ends the processing when the memory test is finished for all of the areas (S507). Described next is a method of determining which optional program 436 is to be started up in Step S508.

Figure 12B:
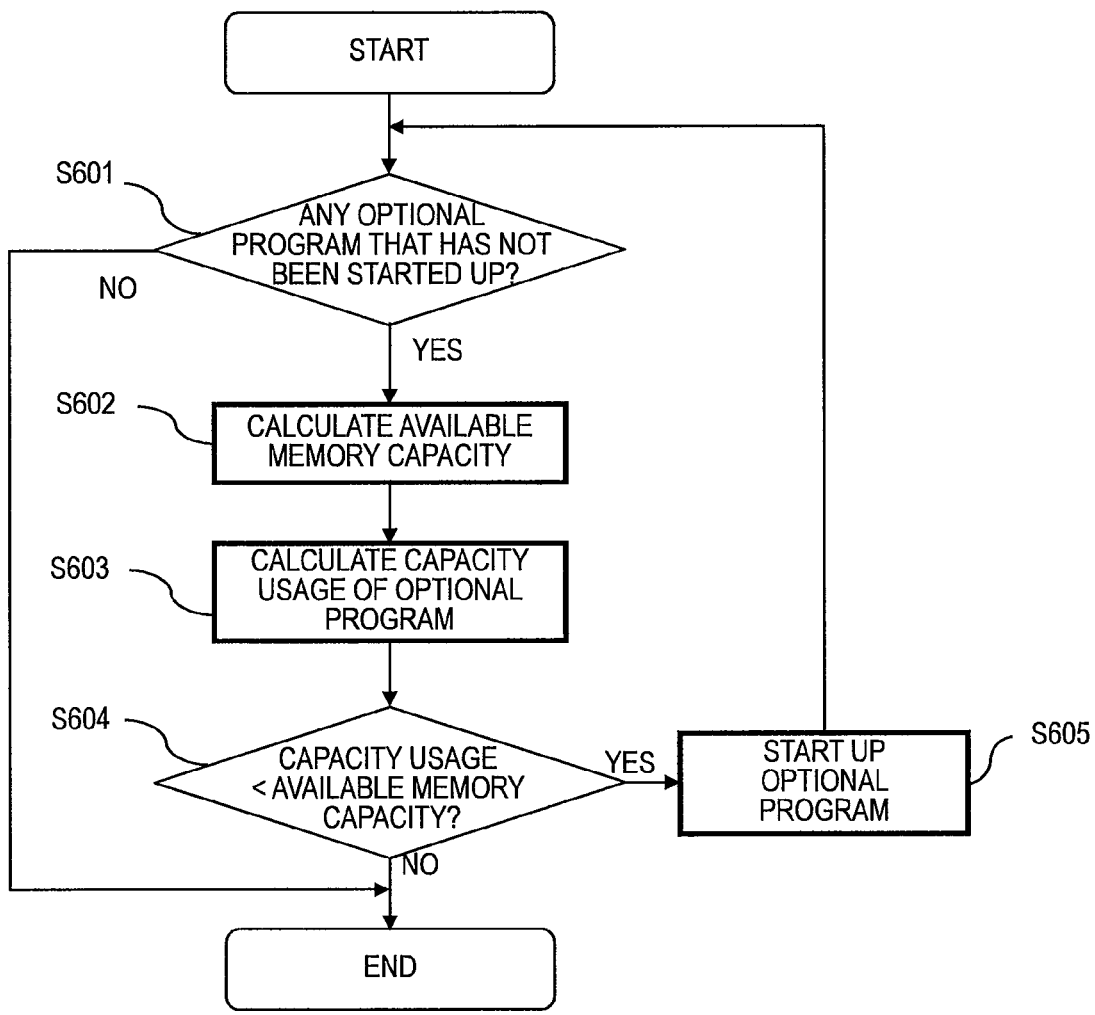
FIG. 12B is a flow chart showing processing that is executed by the OS program in optional program start up processing in accordance with the second embodiment of this invention.

FIG. 12B is a flow chart showing processing that is executed by the OS program 433 in optional program start up processing according to the second embodiment of this invention.

First, the OS program 433 judges whether or not there are any optional programs 436 that have not been started up yet (S601). When there is at least one optional program 436 that is not in operation, the OS program 433 advances the processing and calculates the available memory capacity (S602). When there is no optional program 436 that is not in operation, the OS program 433 ends the processing.

The available memory capacity is a capacity calculated by subtracting, from 10% of the size of memory areas initialized in Step S505, a memory capacity that is being used by the optional program 436 that has been started up after the initialization. 10% of the initialized memory capacity is given merely as an example, and the percentage may be larger (or smaller). Next, the OS program 433 chooses one optional program 436 to be started up based on the priority level 511C in the optional program configuration information 511, and checks the memory capacity usage 511B of this optional program 436 (S603). Then, the OS program 433 compares the available memory capacity calculated in Step S602 against the memory capacity usage checked in Step S603 (S604).

When the available memory capacity is larger than the memory capacity usage of the optional program 436, the OS program 433 starts up this optional program 436 (S605), and then starts processing the next optional program 436. Otherwise (when the available memory capacity is smaller than the memory capacity usage of the optional program 436), the OS program 433 ends the processing of starting up the optional program 436.

Next, a method of determining a file system to be failed back in Step S506 will be described.

Figure 12C:
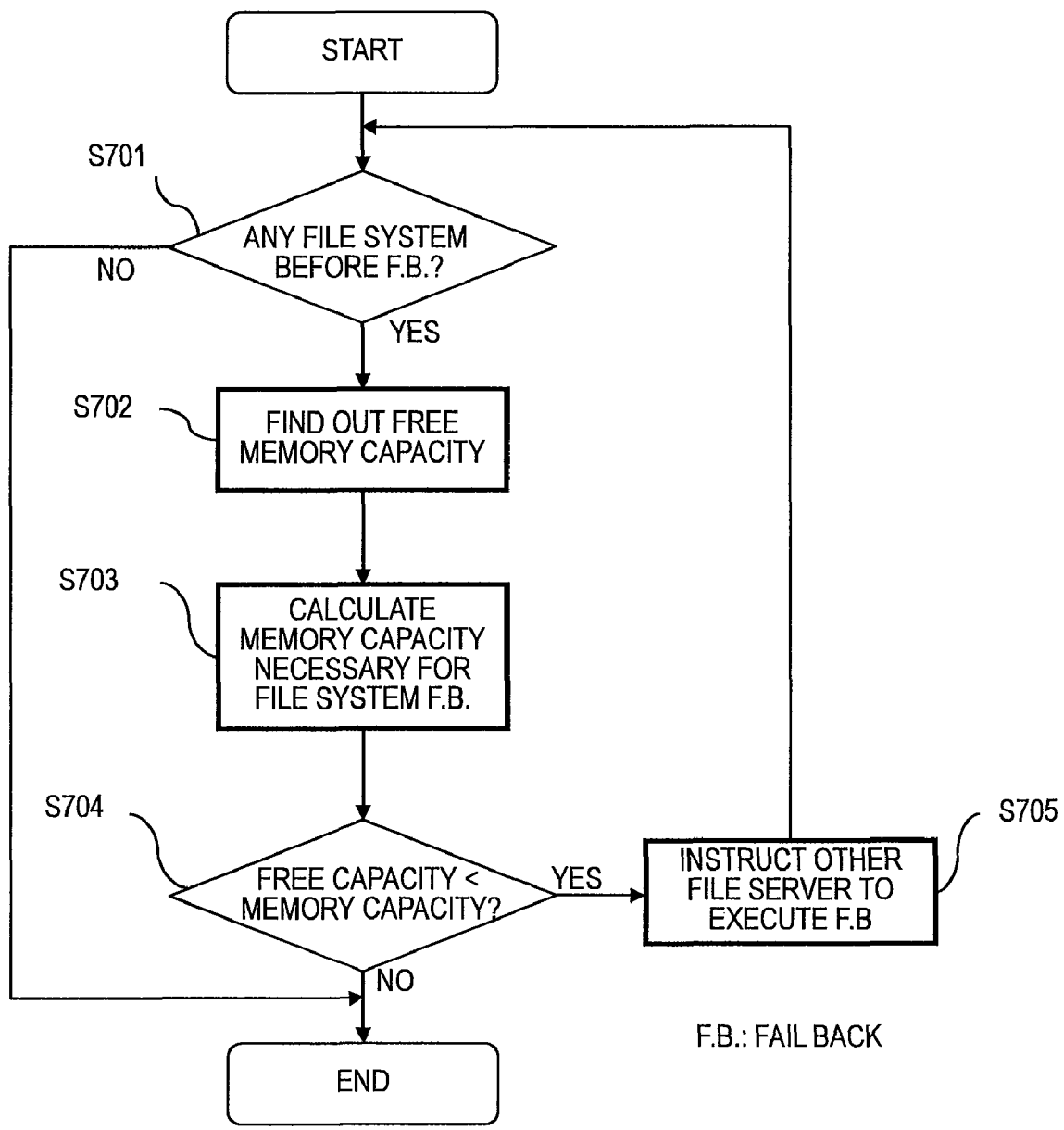
FIG. 12C is a flow chart showing processing that is executed by the OS program in file system takeover processing in accordance with the second embodiment of this invention.

FIG. 12C is a flow chart showing processing that is executed by the OS program 433 in file system takeover processing according to the second embodiment of this invention.

The processing shown in FIG. 12C is executed by the OS program 433 of the file server 1 (400A) when the file server 1 (400A) takes over failed back file systems in Step S506 of FIG. 12A.

First, the OS program 433 checks the cluster configuration information 513 to judge whether or not any file systems are left that have not been failed back (S701). When there is a file system that has not been failed back, the OS program 433 finds out the free memory capacity (the capacity of memory areas that have finished the memory test and that are not in use) (S702). When no file system is left that has not been failed back (when failback of every file system is finished), the OS program 433 ends the processing.

After Step S702, the OS program 433 chooses one file system to be handed over through failover, and figures out the memory capacity necessary for the chosen file system (S703). In this step, a file system to be handed over through failover is chosen based on the priority level 512F in the file system configuration information 512. The memory capacity necessary for the chosen file system is calculated by the method shown in Steps S401 to S403 of FIG. 10B.

Then, the OS program 433 judges whether or not the free memory capacity figured out in Step S702 is larger than the memory capacity necessary for the chosen file system (S704). When the free memory capacity is larger than the necessary memory capacity, the OS program 433 requests the file server 2 (400B) to fail back the file system (S705), and then executes Steps S701 to S704 for a file system that is chosen next. When the free memory capacity is smaller than the necessary memory capacity, the OS program 433 ends the processing.

Through this processing, the file server 1 (400A) can dynamically change the count of running file systems by itself to a count suited to the available memory capacity. Accordingly, the file server 1 (400A) can lessen its own load when the memory capacity is short, and thus prevents the file service performance immediately after system boot up from dropping lower than the performance level in normal operation.

In the second embodiment, a file system is given as an example of a resource to be handed over through failover. Alternatively, a file system group constituted by a plurality of file systems, a virtual file server, or the like may be handed over through failover. Also, while the second embodiment shows as an example a method in which an optional program to be started up after a memory test and a file system to be failed back are determined automatically, these may instead be designated by the administrator in advance.

Third Embodiment

A third embodiment of this invention will be described with reference to FIGS. 1 and 2 and FIGS. 13 and 14.

(3-1) Configuration of a Computer System according to the Third Embodiment

The computer system configuration according to the third embodiment is the same as the computer system configuration according to the first embodiment which is illustrated in FIGS. 1 and 2. The computer system of the third embodiment differs from the computer system of the first embodiment in that the memory capacity to be tested by an upon-boot-up memory test is changed by an instruction from the administrator. Specifically, in the third embodiment, the administrator uses the management graphical user interface (GUI) program 110 in the management terminal 100 to specify the capacity of the cache data 4391 necessary upon system boot up, the session count, and the optional program 436. The memory capacity to be tested by an upon-boot-up memory test is changed based on the specified values.

(3-2) Outline of the Third Embodiment

In the upon-boot-up memory test of the first and second embodiments, the memory size to be tested by a memory test upon system boot up is determined by a predetermined calculation method based on the file system configuration and the presence or absence of the optional program 436. With this method, necessary performance can be obtained immediately after system boot up in many cases. However, in a use where the applied load is larger than normal, such a generalized calculation method can lead to a shortage of memory capacity and ultimately to overload.

The third embodiment solves this problem by allowing the administrator to specify, through the management GUI program 110 of the management terminal 100, the capacity of the cache data 4391 necessary upon system boot up, the session count, the optional program 436 that runs upon system boot up, and the service level of, for example, a file system managed by the file server 400 for which the service level is set. The memory capacity to be tested by an upon-boot-up memory test can thus be increased or reduced.

The third embodiment will be outlined by describing an example of an upon-boot-up service level setting window.

FIG. 13 is an explanatory diagram showing a service level setting window according to the third embodiment of this invention.

When putting the file server 400 into operation, the administrator uses the management terminal 100 to set items shown in FIG. 13: a cache data capacity 110A, a session count 110B, a meta data cache capacity 110E, an optional program 110C, and a running-upon-boot-up file system 110D. The service level immediately after system boot up can thus be set. The cache data capacity 110A here is the capacity of the cache data 4391 that can be stored upon system boot up. The session count 110B here is the count of sessions with clients that can be stored upon system boot up. The meta data cache capacity 110E here is a memory capacity allocated exclusively to file management information separately from the cache data 4391.

The optional program 436 that is to be started up upon system boot up is specified in a field for the optional program 110C. The administrator (or user) can thus specify a program necessary to start providing a file service and a program that is to be started up after the file server 400 starts providing a file service.

Programs necessary to start providing a file service are programs that are provided after the file server 400 starts providing a file service, and include, in addition to the optional program 436 set by the administrator (or user), programs that are started up, irrespective of settings set by the user (e.g., OS program 433). The administrator (or user) sets a program necessary to start providing a file service by, for example, checking a checkbox in the field for the optional program 110C on the service level setting window of FIG. 13.

Programs that are to be started up after the file server 400 starts providing a file service are programs that are additionally provided after the file server 400 starts providing a file service, and that are set by the administrator (or user). The administrator (or user) sets a program that is to be started up after the file server 400 starts providing a file service by, for example, not checking a checkbox in the field for the optional program 110C on the service level setting window of FIG. 13. The file server 400 may include programs that are not necessary to provide a file service, owing to the license condition and the user's settings. Those programs may be excluded from among programs that are to be started up after the file server 400 starts providing a file service, and may not be stored in memory areas that have been tested by the background memory test program 435.

In the running-upon-boot-up file system 110D, a file system that is to be run upon system boot up on its own file server 400 is specified. Securing an exclusive area for meta data cache ensures that file management information of a fixed count of files or more is cached without fail, which speeds up other operations than file read/write, such as obtaining file information.

In the third embodiment, with the input information being as shown in FIG. 13, a capacity of 2 GB is set for the cache data 4391, a capacity of 0.5 GB (corresponding to 4,000 sessions) is set for storage of the session information 4392, and a capacity of 1 GB is set for the meta data cache. When the capacity for the OS is 1 GB and the capacity for the optional program 436 (backup program) is 0.5 GB, the total upon-boot-up memory test capacity is calculated as 5 GB. The third embodiment employs the same calculation method as in the first embodiment to calculate the memory capacities for the OS, for storage of the session information 4392, and for the optional program 436. Their descriptions are therefore omitted here. The specific values given above are merely an example, and may be replaced by values suited to a file server running environment that is employed.

Settings set through the upon-boot-up service level setting window are sent by the management GUI program 110 to the management program 437 of the file server 400, and the transmitted settings are reflected on the memory area information 439. When the file server 400 executes system boot up next time (and subsequent occasions where the system is booted up), a specified memory area is tested by an upon-boot-up memory test according to these settings.

This processing enables the file server 1 (400A) to accomplish the necessary service level immediately after system boot up.

(3-3) Memory Test Method according to the Third Embodiment

The description given below is about differences between the third embodiment and the first and second embodiments.

Figure 14:
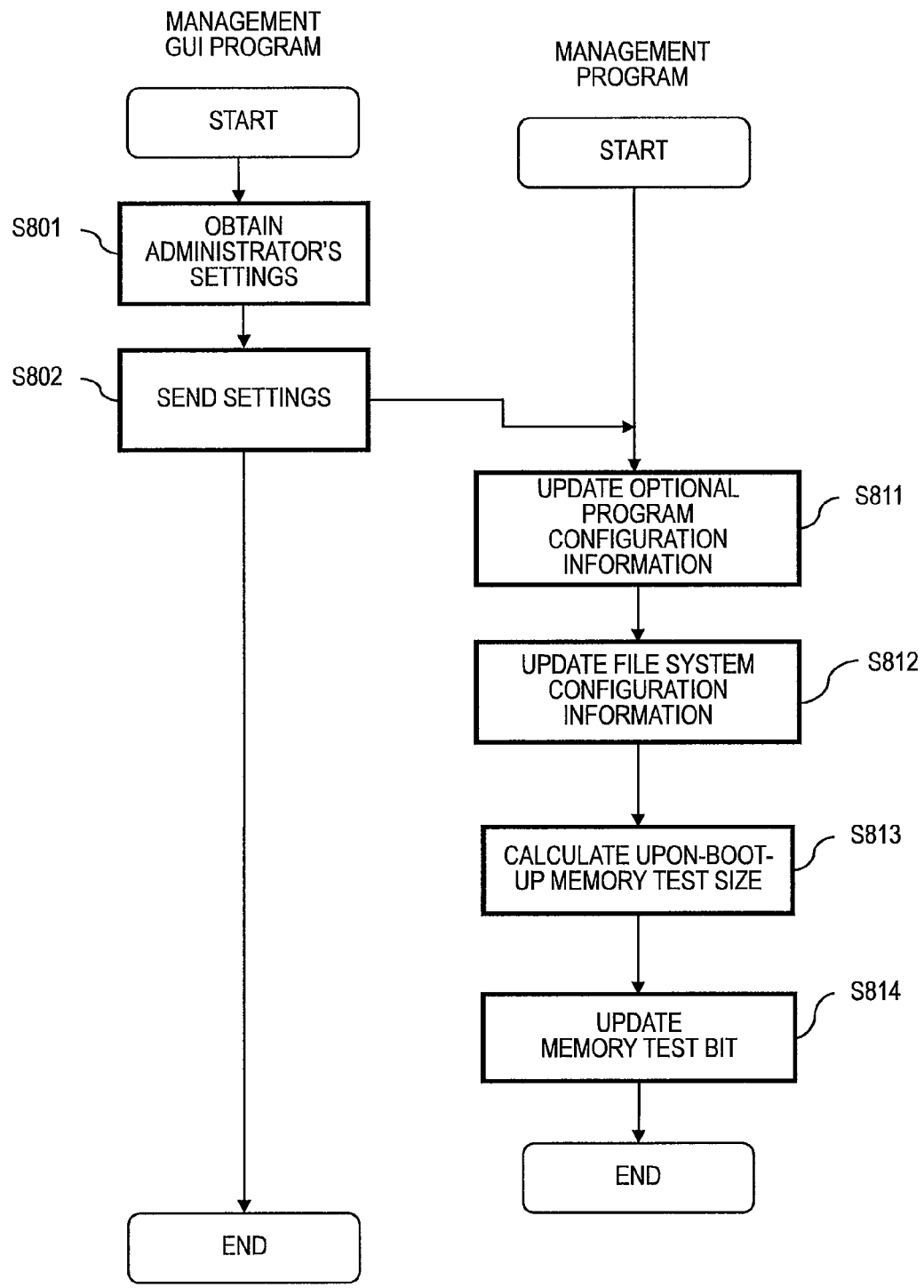
FIG. 14 is a flow chart showing processing that is executed by a management GUI program and a management program to change a file system configuration in accordance with the third embodiment of this invention.

FIG. 14 is a flow chart showing processing that is executed by the management GUI program 110 and the management program 437 to change the file system configuration according to the third embodiment of this invention.

First, the management GUI program 110 obtains settings set by the administrator through the upon-boot-up service level setting window (S801). Next, the management GUI program 110 sends the administrator's settings to the management program 437 (S802). The management program 437 receives the settings sent by the management GUI program 110. Next, the management program 437 reads the optional program configuration information 511 and, when the read settings differ from the settings received from the management GUI program 110, updates the optional program configuration information 511 such that the received settings are reflected (S811).

Next, the management program 437 reads the file system configuration information 512 and, when the read settings differ from the settings received from the management GUI program 110, updates the file system configuration information 512 such that the received settings are reflected (S812).

Thereafter, the management program 437 calculates the upon-boot-up memory test size (S813). In Step S813, when a memory test size value that is calculated by the method described in the first embodiment is short of the cache data capacity 110A and the session count 110B which are set through the upon-boot-up service level setting window, the management program 437 adds the difference to the memory test size that is calculated by the method described in the first embodiment. Then, the management program 437 updates the memory area information 439 in the manner described in the first embodiment (S814).

Through this processing, the file server 1 (400A) sets an upon-boot-up memory test size that fulfills a service level set by the administrator, thereby accomplishing the necessary service level immediately after system boot up. The memory test method according to the third embodiment thus enables the administrator to change memory areas to be tested by an upon-boot-up memory test so that the necessary service level is obtained.

While a service level setting method that uses the management GUI program 110 running on the management terminal 100 is described in the application example of the third embodiment, the third embodiment is not limited to this setting method. Specifically, the third embodiment is applicable also to the case where the management terminal 100 provides a character-based user interface or command line user interface (CUI), and the case where the file server 400 provides a GUI/CUI.

Further, this invention is applicable to various other machines than file servers, for example, disk array controllers, main frame computers, general-purpose servers, and general-purpose personal computers (PCs).

While the present invention has been described in detail and pictorially in the accompanying drawings, the present invention is not limited to such detail but covers various obvious modifications and equivalent arrangements, which fall within the purview of the appended claims.

What is claimed is:

1. A file server which provides a file service to a host computer, comprising:
   an interface coupled to the host computer;
   a processor;
   a memory; and
   an interface coupled to a disk drive,
   wherein the file server is configured to:
   calculate a capacity of storage areas in the memory, which is required to provide the file service;
   execute a first memory check in which the storage areas having the calculated capacity are tested;
   execute, after the first memory check is completed, a second memory check in which remaining storage areas in the memory are tested; and
   start, in a period after the first memory check is completed and before the second memory check is completed, providing the file service,
   wherein the file server provides a synchronous write file service and an asynchronous write file service, and
   wherein a capacity of the storage areas, which is required to provide the synchronous write file service is calculated so as to be smaller than a capacity of the storage areas, which is required to provide the asynchronous write file service.

2. The file server according to claim 1, wherein the capacity of the storage areas, which is required to provide the file service is calculated based on an operating system which runs on the file server, a file system configuration, and a capacity of a cache memory for providing the file service.

3. The file server according to claim 2, wherein the capacity of the storage areas, which is required to provide the file service is calculated further based on a maximum count of the host computers coupled, and a capacity required for programs other than the operating system to start providing the file service.

4. The file server according to claim 1, wherein the file server is configured to:
   in a case where a trouble is detected in one storage area during the first memory check, test another storage area in the memory and, in a case where the test finds the another storage area in the memory to be normal, allocate the another storage area as an area required to provide the file service; and
   in a case where a trouble is detected in one of the remaining storage areas in the memory during the second memory check, output information that informs of the detection of the trouble without allocating the storage area where the trouble has been detected.

5. The file server according to claim 1, wherein the file server is configured to:
   keep a plurality of programs that are started up after the file server starts providing the file service;
   keep information that indicates a priority level of each of the plurality of programs that are started up after the file server starts providing the file service;
   test, after finishing testing the storage areas having the calculated capacity, the remaining storage areas in the memory; and
   start up the plurality of programs that are started up after the file server starts providing the file service, based on a capacity of the remaining storage areas on which the test have been finished, in an order determined by the priority level.

6. The file server according to claim 1, wherein the capacity of the storage areas, which is required to provide the file service is calculated when a configuration of the file server is changed.

7. A method of starting up a file server which provides a file service to a host computer, the file server including an interface that is coupled to the host computer, a processor, a memory, and an interface that is coupled to a disk drive, the method comprising:
   a first step of calculating a capacity of storage areas in the memory, which is required to provide the file service;
   a second step of testing the storage areas having the calculated capacity;
   a third step of testing, after the second step is completed, remaining storage areas in the memory; and
   a fourth step of starting, in a period after the second step is completed and before the third step is completed, providing the file service,
   wherein the file server provides a synchronous write file service and an asynchronous write file service, and
   wherein the first step includes the step of calculating a capacity of the storage areas, which is required to provide the synchronous write file service so as to be smaller than a capacity of the storage areas, which is required to provide the asynchronous write file service.

8. The method of starting up a file server according to claim 7, wherein, in the first step, the capacity of the storage areas, which is required to provide the file service is calculated based on an operating system which runs on the file server, a file system configuration, and a capacity of a cache memory for providing the file service.

9. The method of starting up a file server according to claim 8, wherein, in the first step, the capacity of the storage areas, which is required to provide the file service is calculated further based on a maximum count of the host computers coupled, and a capacity required for programs other than the operating system to start providing the file service.

10. The method of starting up a file server according to claim 7,
wherein the file server is divided into a plurality of virtual file servers, and
wherein each of the plurality of virtual file servers provides the file service.

11. The method of starting up a file server according to claim 10, further comprising:
a fifth step of starting up each of the plurality of virtual file servers when each of the plurality of virtual file servers finishes testing the storage areas having the capacity required to provide the file service.

12. The method of starting up a file server according to claim 10,
wherein, in the fifth step, the capacity of the storage areas, which is required to provide the file service is calculated based on a file system configuration, and
wherein the file system configuration used in the capacity calculation includes at least one of a file system capacity, a virtual file server count, a count of files contained in a file system, and an amount of meta data of the files.

13. The method of starting up a file server according to claim 7, wherein the first step is executed when a configuration of the file server is changed.

* * * * *